United States Patent [19]

Maekawa et al.

[11] Patent Number: 5,386,271
[45] Date of Patent: Jan. 31, 1995

[54] CENTRALIZED CONTROL SYSTEM FOR AN IMAGE FORMING APPARATUS WHICH EMPLOYS FUZZY LOGIC TO IDENTIFY ABNORMAL CONDITIONS

[75] Inventors: Kazunobu Maekawa, Toyokawa; Sumiaki Hirata, Aichi; Ikunori Yamaguchi, Toyokawa, all of Japan

[73] Assignee: Minolta Camera Kabushiki Kaisha, Osaka, Japan

[21] Appl. No.: 928,359

[22] Filed: Aug. 12, 1992

[30] Foreign Application Priority Data

Aug. 30, 1991 [JP] Japan .................................. 3-244797

[51] Int. Cl.$^6$ ............................................. G03G 21/00
[52] U.S. Cl. ..................................... 355/204; 355/206; 355/207; 355/208; 395/900
[58] Field of Search ............... 355/202, 203, 204, 205, 355/206, 207, 208; 364/274.6, 274.5, 138; 371/29.1; 379/106; 395/900

[56] References Cited

U.S. PATENT DOCUMENTS

| | | |
|---|---|---|
| 3,893,175 | 7/1975 | Solomon . |
| 3,997,873 | 12/1976 | Thornton . |
| 4,322,813 | 3/1982 | Howard et al. . |
| 4,497,037 | 1/1985 | Kato et al. . |
| 4,549,044 | 10/1985 | Durham . |
| 4,583,834 | 4/1986 | Seko et al. . |
| 4,589,080 | 5/1986 | Abbott et al. . |
| 4,739,366 | 4/1988 | Braswell et al. . |
| 4,783,748 | 11/1988 | Swarztrauber et al. . |
| 4,979,132 | 12/1990 | Sugimoto . |
| 4,996,703 | 2/1991 | Gray . |
| 5,023,817 | 6/1991 | Au et al. . |
| 5,029,314 | 7/1991 | Katsumi et al. . |
| 5,053,815 | 10/1991 | Wendell ............................ 355/208 |
| 5,057,866 | 10/1991 | Hill . |
| 5,077,582 | 12/1991 | Kravette et al. . |
| 5,084,875 | 1/1992 | Weinberger et al. . |
| 5,184,179 | 2/1993 | Tarr et al. ............................ 355/206 |
| 5,200,779 | 4/1993 | Nawata ............................ 355/206 |
| 5,200,958 | 4/1993 | Hamilton et al. ............... 371/29.1 X |
| 5,214,476 | 5/1993 | Nomura et al. ................. 355/204 X |
| 5,216,461 | 6/1993 | Maekawa et al. ..................... 355/202 |
| 5,220,373 | 6/1993 | Kanaya ..................... 355/204 |
| 5,220,380 | 6/1993 | Hirata et al. ..................... 355/204 |
| 5,224,157 | 6/1993 | Yamada et al. ................. 379/106 X |
| 5,231,452 | 7/1993 | Murayama et al. .................. 355/208 |

FOREIGN PATENT DOCUMENTS

0402143A2 12/1990 European Pat. Off. .
0444629A2 9/1991 European Pat. Off. .
60-90460 5/1985 Japan .

OTHER PUBLICATIONS

Research Newletter, Dataquest, Inc., Feb. 1989, CDIS Newsletter, "Remote Diagnostic Tool Kit of the Future" pp. 1-6.

Primary Examiner—A. T. Grimley
Assistant Examiner—Nestor R. Ramirez
Attorney, Agent, or Firm—Burns, Doane, Swecker & Mathis

[57] ABSTRACT

A copier system or similar image forming system includes a centralized control unit. The centralized control unit has a data base storing information pertaining to machine model specifications, operating manuals and other related know-how pertinent to the operation of the copiers. Using data received from the copying machines, the centralized control unit employs fuzzy logic to identify abnormal operating conditions of the copiers and possible repair procedures.

18 Claims, 25 Drawing Sheets

FIG.3
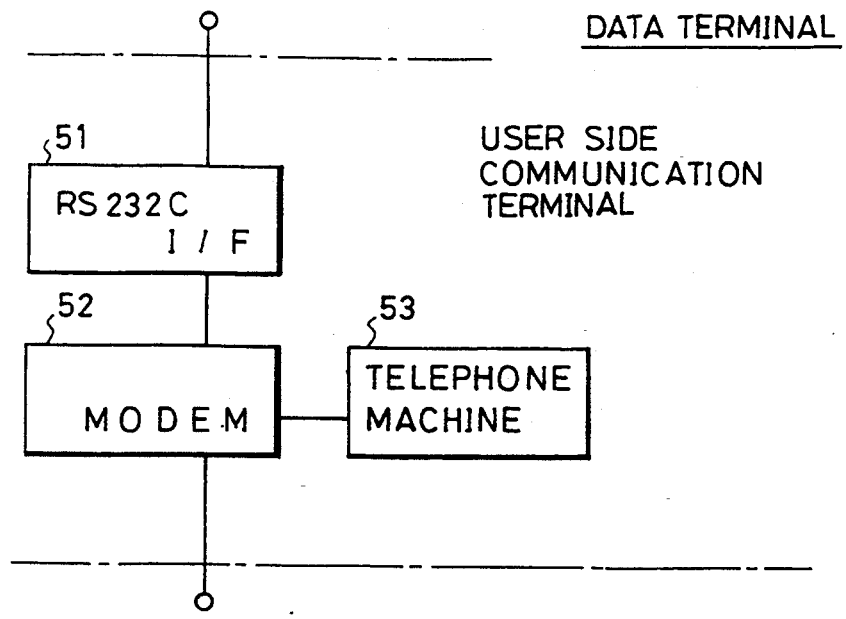
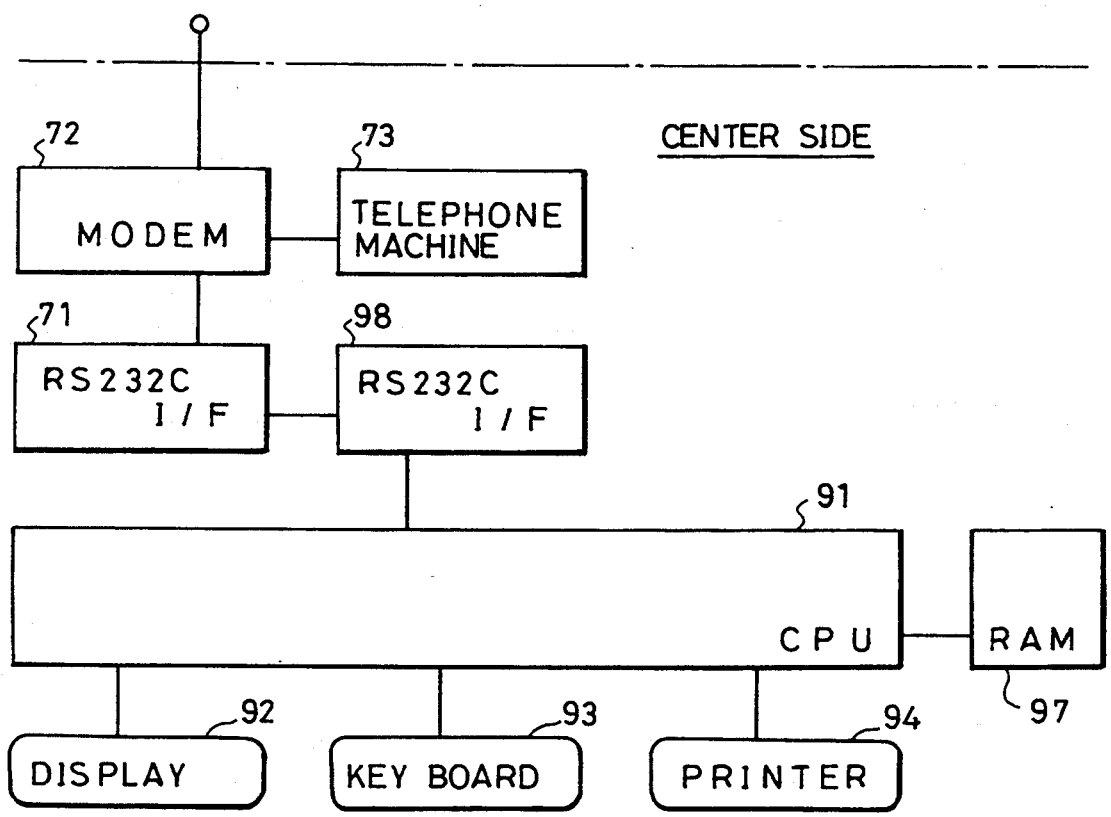

DISCHARGE CODE : DISCHARGE A PIECE OF PAPER
= FALL OF $b_0$

JAM CODE : $b_7 = 1$, $b_6 = 0$

TROUBLE CODE : $b_7 = 1$, $b_6 = 1$

FIG. 21

| DTID | NAME OF USER | CAUSE OF TROUBLE | MEASURE TO BE TAKEN | POSSIBILYTY |
|---|---|---|---|---|
| 3 | C C C | STAIN OF OPTICAL SYSTEM | CLEANING | 0.86 |
| 25 | Y Y Y | FAULTY PAPER SUPPLY CLUTCH | EXCHANGE | 0.79 |
| 7 | G G G | LIFETIME OF PHOTORECEPTOR OVER | EXCHANGE | 0.68 |

FIG. 22

DTID = 25          NAME OF USER = YYY

| CAUSE OF TROUBLE | MEASURE TO BE TAKEN | POSSIBILITY | APPLIED RULE |
|---|---|---|---|
| FAULTY PAPER SUPPLY CLUTCH | EXCHANGE | 0.79 | POWER-SUPPLY IS NOMAL AND OPERATION TIME IS SLOW |
| STAIN OF PAPER SUPPLY ROLLER | CLEANING · EXCHANGE | 0.37 | ROLLER IS STAINED |
| PAPER REMAINING | REMOVE | 0.35 | A LOT OF JAM |

| CONDITIONS | CONDITIONS |
|---|---|
| IMAGE IS WHITE | MANY JAMS IN PAPER SUPPLY UNIT |
| IMAGE IS BLACK | MANY JAMS IN TRANSFER UNIT |
| WHITE LINES IN IMAGE | MANY JAMS IN SEPARATING UNIT |
| BLACK LINES IN IMAGE | MANY JAMS IN FIXING UNIT |
| IMAGE IS FAINT | . |
| IMAGE IS DENSE | . |
| . | . |
| . | . |

FIG.25

| RULE NO | | | CONCLUSION | MEASURE TO BE TAKEN | RULE WEIGHT |
|---|---|---|---|---|---|
| 1 | CONDITION 1 | POWER-SUPPLY IS NORMAL | FAULTY PAPER-SUPPLY CLUTCH | EXCHANGE | 0.6 |
| | CONDITION 2 | PAPER-SUPPLY CLUTCH OPERATION TIME IS SLOW | | | |
| 2 | CONDITION 1 | SURFACE OF PAPER-SUPPLY ROLLER IS DIRTY | STAIN OF PAPER-SUPPLY ROLLER | CLEANING EXCHANGE | 0.7 |
| 3 | CONDITION 1 | A LOT OF JAMS | PAPER REMAINING | REMOVE | 0.5 |
| 4 | CONDITION 1 | A VALUE OF COUNTER FOR LIFE OF PHOTORECEPTOR IS LARGE | LIFE-TIME OF PHOTORECEPTOR IS OVER | EXCHANGE | 0.9 |
| | CONDITION 2 | POTENTIAL IS NOT APPLIED | | | |
| 5 | CONDITION 1 | IMAGE IS FAINT | DECREASE OF SENSITIVITY OF PHOTORECEPTOR | EXCHANGE | 0.7 |
| 6 | CONDITION 1 | IMAGE IS FAINT | DECREASE OF SENSITIVITY OF PHOTORECEPTOR | INCREASE CONTROL TONER CONCENTRATION | 0.7 |
| 7 | CONDITION 1 | P/C TONER ATTACHMENT QUANTITY IS SMALL | DECREASE OF SENSITIVITY OF PHOTORECEPTOR | INCREASE CONTROL TONER CONCENTRATION | 0.7 |
| ⋮ | ⋮ | ⋮ | ⋮ | ⋮ | ⋮ |

FIG. 27

(1) | SETTING CHANGE COMMAND | NO. | SET VALUE |

(2) | OPERATION COMMAND | NO. |

FIG. 28

SETTING CHANGE COMMAND

| NO. | ITEM | VALUE | CONTENT |
|---|---|---|---|
| 1 | TONER CONCENTRATION | 1<br>2<br>3<br>4<br>5<br>.<br>. | 5 %<br>6 %<br>7 %<br>8 %<br>9 %<br>.<br>. |
| 2 | P/C SURFACE POTENTIAL | 1<br>2<br>3<br>4<br>.<br>. | STANDARD<br>+ 20 V<br>+ 40 V<br>+ 60 V<br>.<br>. |
| 3 | DEVELOPMENT BIAS | 1<br>2<br>3<br>4<br>.<br>.<br>. | STANDARD<br>+ 10 V<br>+ 20 V<br>+ 30 V<br>.<br>.<br>. |

FIG. 29

| NO. | OPERATION COMMAND |
|---|---|
| 1 | OPERATION EQUIVALENT TO PRINT-KEY DEPRESSION |
| 2 | OPERATE ONLY OPTICAL SYSTEM |
| 3 | OPERATE ONLY PAPER PASSING SYSTEM |
| 4 | OPERATE ONLY DEVELOPMENT MOTOR |
| . | . |
| . | . |
| . | OPERATE ONLY PAPER-SUPPLY CLUTCH |
| . | . |
| . | . |
| . | OPERATION EQUIVALENT TO "1" KEY DEPRESSION |
| . | OPERATION EQUIVALENT TO "2" KEY DEPRESSION |
| . | . |
| . | . |
| . | OPERATION EQUIVALENT TO MAGNIFICATION "×1.00" KEY DEPRESSION |
| . | OPERATION EQUIVALENT TO MAGNIFICATION "×0.707" KEY DEPRESSION |
| . | OPERATION EQUIVALENT TO COPY MODE "DUPLEX" KEY DEPRESSION |

CENTRALIZED CONTROL SYSTEM FOR AN IMAGE FORMING APPARATUS WHICH EMPLOYS FUZZY LOGIC TO IDENTIFY ABNORMAL CONDITIONS

BACKGROUND OF THE INVENTION

1. Field of the Invention

The present invention relates to control systems for image forming apparatuses, and particularly to a system for performing control by diagnosing conditions of copying machines, corresponding to respective copying machine control devices, at a centralized control unit, on the basis of data transmitted from each of the copying machine control devices to the centralized control unit through a communication line.

2. Description of the Related Art

A system is proposed in which control data from a plurality of copying machines are transmitted to a single central processing unit and collectively processed in the processing control unit (U.S. Pat. No. 4,583,834).

An apparatus is also proposed for controlling a plurality of copying machines in which control data from each copying machine is transmitted to a single central control unit through respective terminal devices and processed in the control unit (U.S. Pat. No. 4,497,037).

In the above-described conventional systems, unprocessed data showing conditions of a copying machine is provided as an output. The unprocessed data include toner concentration, photoreceptor potential and the like detected by sensors, to which no processing has been applied.

Accordingly, such determinations as whether "the toner concentration is appropriate and, if it is not, what kind of measure is to be taken ?" must be made by a man (service man) referring to a manual or the like. However, service men individually have various levels of experience and it may be difficult to take appropriate measures. Furthermore, even a well-experienced service man may not have full knowledge about some machine models. In such a case, he has to refer to the manual.

SUMMARY OF THE INVENTION

It is an object of the present invention to make maintenance of an image forming apparatus easier in a control system for an image forming apparatus.

It is another object of the present invention to quickly diagnose a troubled portion of an image forming apparatus in a control system for an image forming apparatus.

It is still another object of the present invention to improve accuracy of diagnosis of a troubled portion of an image forming apparatus in a control system for an image forming apparatus.

In order to achieve the above-mentioned objects, a control system for an image forming apparatus according to the present invention includes an image forming apparatus for forming an image on paper and a control unit connected to the image forming apparatus through a communication line, in which the image forming apparatus includes image forming means for implementing an image forming operation according to a predetermined set value for determining picture quality, detecting means for detecting a physical quantity related to an operational condition of the image forming means, and first transmitting means for transmitting the result detected result by the detecting means to the control unit through the communication line. The control unit includes first receiving means for receiving the detected result transmitted from the image forming apparatus and diagnosing means for determining a possibility corresponding to the detected result received by the receiving means using a membership function designating the possibility of occurrence of a predetermined abnormality corresponding to the physical quantity.

In a control system for an image forming apparatus configured as described above, a detected result which is transmitted from the image forming apparatus is received in a control unit and the image forming apparatus is diagnosed on the basis of the detected result using a membership function, so that quick and accurate maintenance is enabled in the image forming apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is the other part of the block diagram illustrating a circuit configuration of the control system of FIG. 1.

FIG. 21 is a descriptive diagram illustrating one example of a displaying manner in a display at the center of FIG. 1.

FIG. 22 is a descriptive diagram illustrating another example of a displaying manner in the display at the center of FIG. 1.

FIG. 25 is a descriptive diagram illustrating specific rules, conditions, conclusions, processings and rule weights used in one embodiment of the present invention.

FIG. 27 is a descriptive diagram illustrating data structure transmitted to the copying machine from the data terminal of FIG. 1.

FIG. 28 is a descriptive diagram illustrating specific contents of a setting change command of FIG. 27.

FIG. 29 is a descriptive diagram illustrating specific contents of an operation command of FIG. 27.

DESCRIPTION OF THE PREFERRED EMBODIMENTS

Embodiments of the present invention will be described below.

[1] Configuration of System

First, a configuration of the system will be described, which includes "a copying machine, a data terminal (DT), a communication line network, a center".

Figure 1:
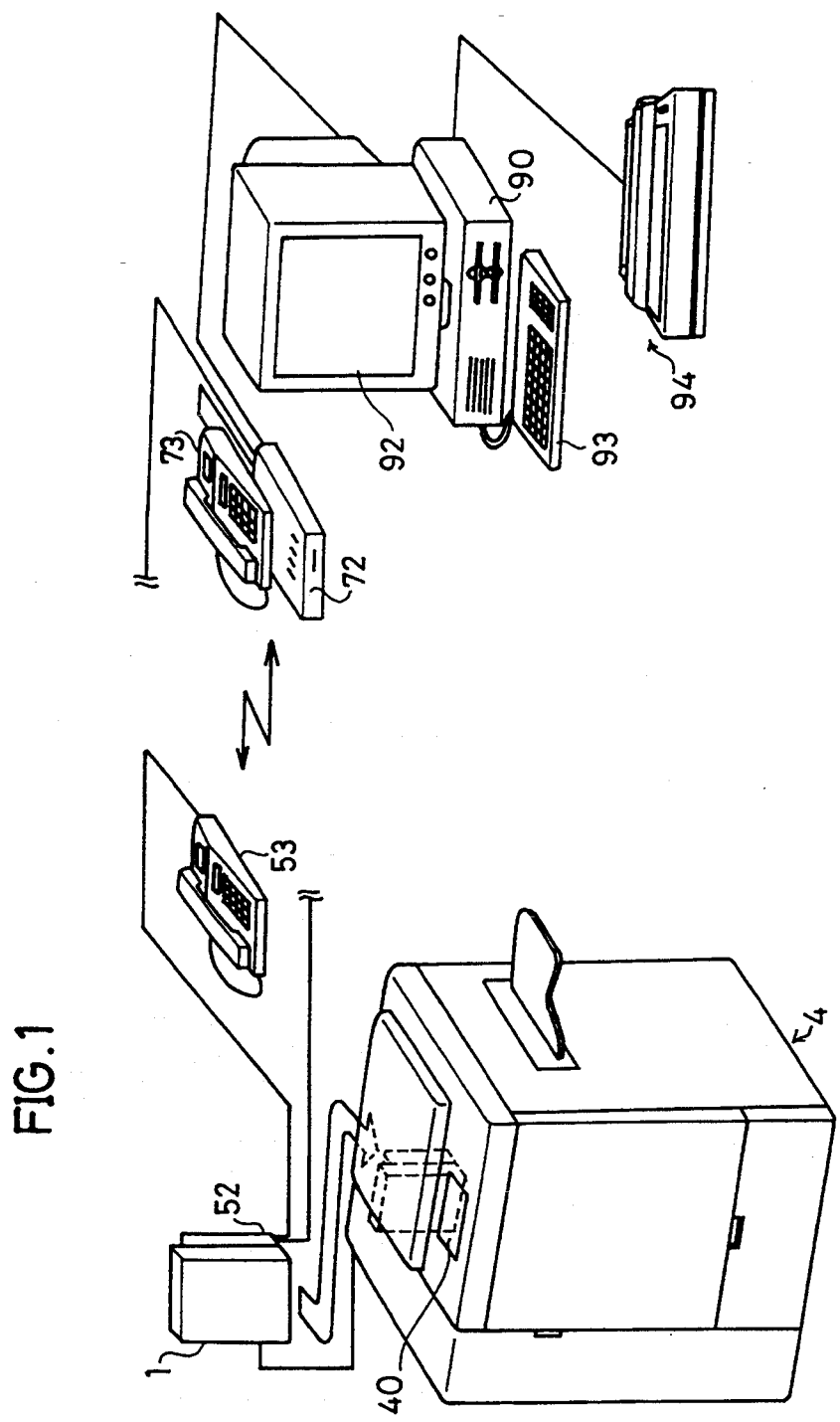
FIG. 1 is a schematic diagram illustrating a structure of a copying machine control system to which one embodiment of the present invention is applied.
Figure 2:
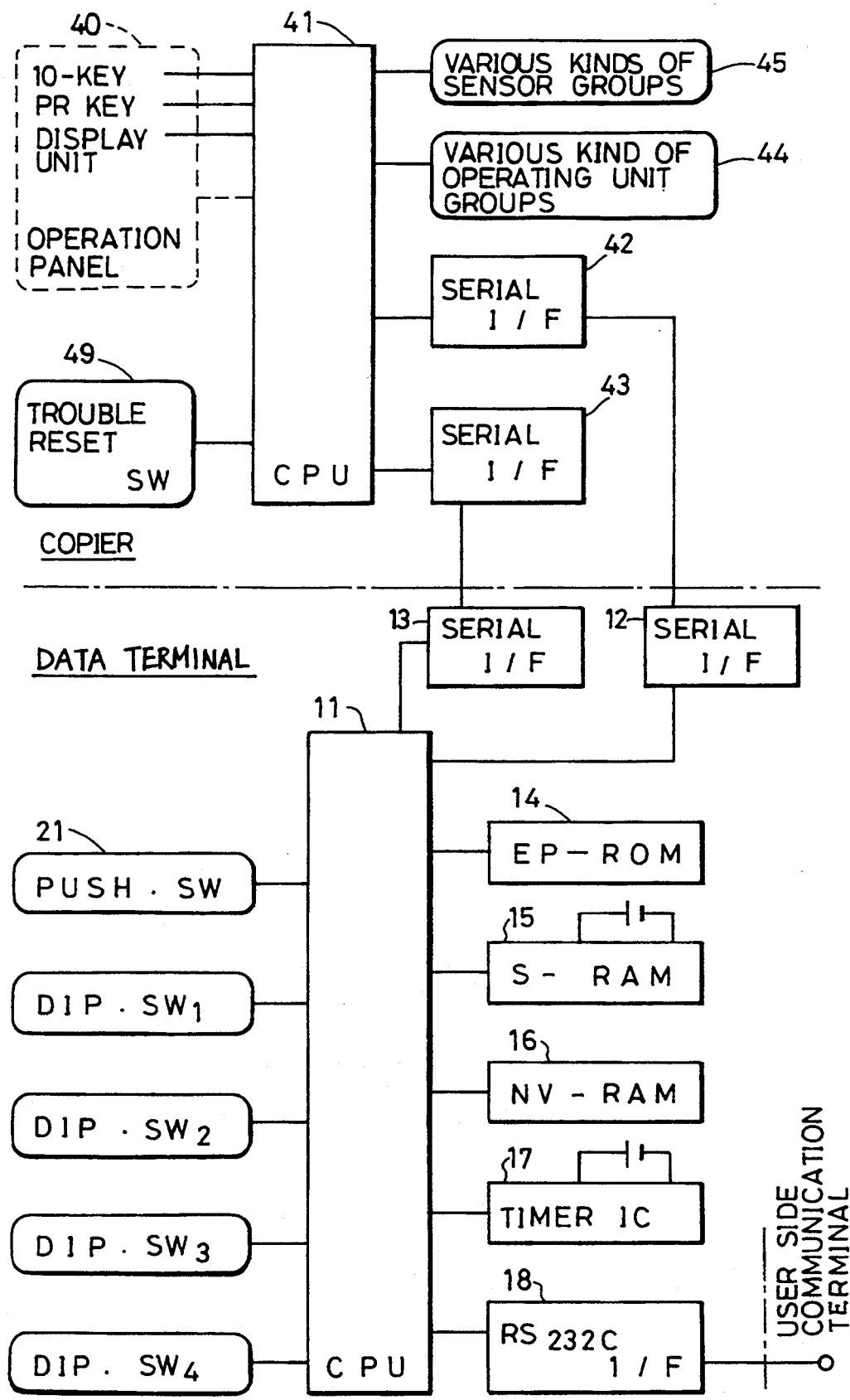
FIG. 2 is a part of a block diagram illustrating a circuit configuration of the control system of FIG. 1.

FIG. 1 is a descriptive diagram of the configuration of the system, and FIGS. 2 and 3 are block diagrams of circuit configurations of the system. This system includes equipment on user sides (equipment at one of a large number of users are shown as an example), equipment on a center side which is a management base, and a communication line network for connecting the equipments.

On the user side, a copying machine 4, a data terminal 1, a modem 52 with a function as a communication terminal device and a telephone machine 53 which is a general communication device are provided.

On the center side, a modem 72 with a function as a communication terminal device, a telephone machine 73 which is a general communication device, and a computer 90 are provided, where a CPU 91 is provided in the computer 90 and a display 92, a keyboard 93, and a printer 94 are connected thereto.

The data terminal 1 is a device for taking in various kinds of information of the copying machine 4, applying predetermined processes thereto, and transmitting the same to the computer 90 on the center side.

On the center side, on the basis of the transmitted data, various kinds of diagnoses are made for a corresponding copying machine. That is, conditions of the copying machine, measures to be taken, and a possibility are operated and displayed. Also, data for management of the copying machine are totalized.

Each of piece equipment will be described below.

(Copying machine 4)

It is an apparatus for scanning an original image and forming a copied image on paper.

In the copying machine 4, various kinds of element data which affect an image forming process (time required for paper transmission, surface potential of photoreceptor drum, toner concentration in a developing solution, an exposure quantity of photoreceptor drum, development bias voltage, quantity of toner attached on photoreceptor drum (image density), grid voltage of corona charger, and the like) are detected by various kinds of sensor groups 45 provided at some portions in the copying machine 4, taken into and processed in the CPU 41, and then transmitted to the CPU 11 of the data terminal 1 through a serial I/F 43 and a serial I/F 13. The above-described various kinds of element data are represented in an abstract manner as element data $X_i$ ($i = 1$—the number of items of element data) in the description of flow charts which will be given later.

In the CPU 41 of the copying machine 4, various values are respectively counted in counters on the basis of which asked charge is calculated on the center side (a total counter indicating the number of paper discharged, a counter by paper size indicating the number of used paper for each paper size), and counters used for maintenance (a JAM counter by part indicating the number of JAM for each part, a trouble counter by part indicating the number of troubles occurring in each part, a PM counter by parts indicating the number of times of use for each of parts), which are transmitted to the CPU 11 of the data terminal 1 through a serial I/F42 and a serial I/F12. The PM counter is for counting the number of use of parts for every part, of which counted values are referred to in determining as to when the parts should be replaced, for example.

Figure 4:
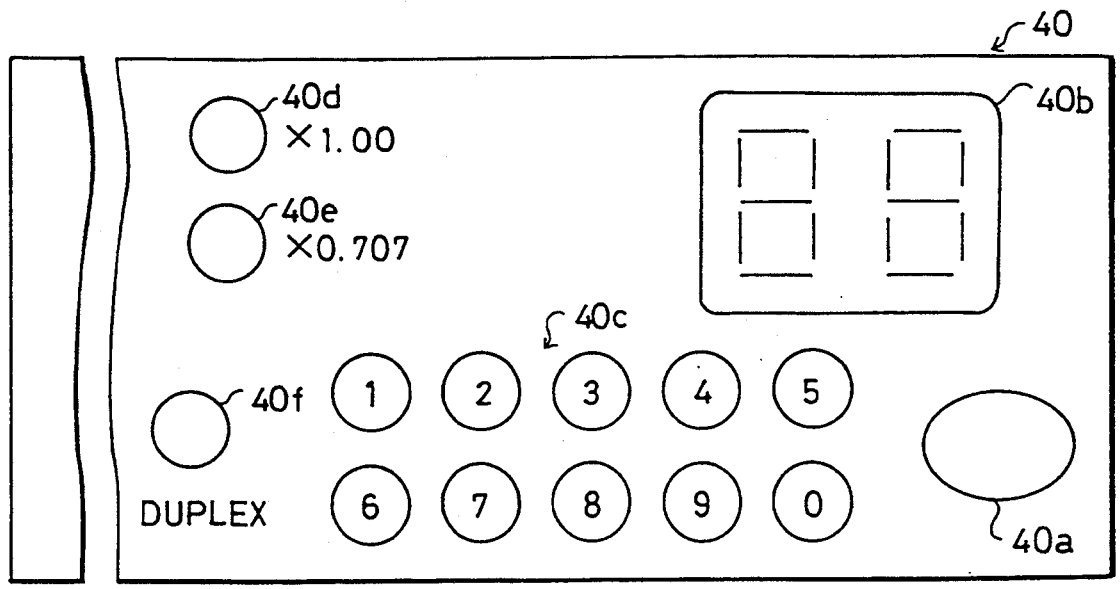
FIG. 4 is a descriptive diagram illustrating a part of an operation panel of a copying machine in the control system of FIG. 1.

Also, in the copying machine 4, signals are inputted from various kinds of key switch groups provided on the operational panel (refer to FIG. 4) 40 (a print key 40a for instructing to start copying operation, a ten-key group 40c for numerical input, an equal-scale magnification key 40d for instructing to set a copying magnification of 1.00, a reduced-scale magnification key 40e for instructing to set a copying magnification of 0.707, a duplex copy mode key 40f for instructing to set a duplex copy mode, and the like), or from various kinds of switch groups provided outside the operation panel (a trouble reset switch 49 for instructing to reset a trouble and the like), and corresponding operations/modes are set on the basis of the input signals.

Furthermore, the settings are changed, or the operations are conducted corresponding to commands (setting change command, operational command; FIGS. 27-29) transmitted from the data terminal 1 through the serial I/F12 and the serial I/F42.

Furthermore, signals and the like corresponding to a set mode are transmitted to the CPU 11 of the data terminal 1 through the serial I/F42 and the serial I/F12. Then, CPU 41 controls various kinds of operating portion groups 44 for forming an image on paper on the basis of an instruction from the operation panel 40 and a control signal transmitted from the CPU 11.

(Data terminal 1)

It is for taking in data of the copying machine 4, and, when a predetermined transmission condition (a condition under which a transmission flag is set to "1": which will be described in detail later) is met, activating the modem 52 to connect the communication line to the center side and transmitting the data for controlling the copying machine (above-mentioned element data, count data, and the like) to the CPU 91 at the center, for example.

Connected to the control CPU 11 of the data terminal 1 are a ROM 14 in which a control program is stored, a non-volatile memory 16 for storing number data and the like, a system RAM 15 for works backed up by a battery, and a timer IC 17 backed up by a battery.

The CPU 11 takes in data sent from the CPU 41 of the copying machine 4 from the serial I/F12 or the serial I/F13 and carries out predetermined processings. Also, it transmits a signal with the structure shown in FIGS. 27 through 29 to the CPU 41 of the copying machine 4. Furthermore, it also sets predetermined operations/modes corresponding to operational input from various kinds of operational switches (a push switch 21, 4 dip switches DIP·SW1-DIP·SW4).

The dip switch DIP·SW4 is a switch for setting an initialization mode. The dip switch DIP·SW1 is for setting an input mode of a selection number (a telephone number) of the center, the dip switch DIP·SW2 is for setting an input mode of an ID number (DTID) for identifying a data terminal 1, and the dip switch DIP·SW3 is for setting an input mode of an ID number (a center ID) for identifying the center, respectively. The push switch 21 is a switch for instructing initialization transmission and the like.

Figure 5:
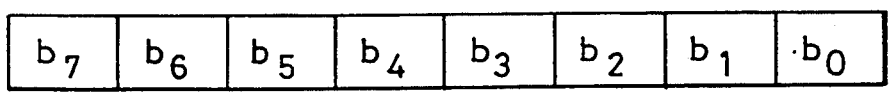
FIG. 5 is a descriptive diagram of codes transmitted to a data terminal connected from the copying machine in FIG. 2.

The 8-bit data $b_7$-$b_0$ inputted from the serial I/F12 to the data terminal 1 is configured as shown in FIG. 5.

That is, a paper discharge code indicating discharge of paper is represented by a fall edge (change from 1 to 0) of the bit $b_0$, and a JAM code indicating occurrence of jammed paper is represented by the bit $b_7=1$ and the bit $b_6=0$. Also, a trouble code indicating occurrence of various kinds of troubles is represented by the bit $b_7=1$ and the bit $b_6=1$.

The above-mentioned 8-bit data is periodically inputted into the data terminal 1 and also inputted when a paper jam or a trouble occurs in the copying machine 4.

On the other hand, the control CPU 11 is connected to a communication I/F (RS232CI/F) 51 of the modem 52 through a communication I/F (RS232CI/F) 18. That is, the data terminal is constructed so as to direct the modem 52 to call the center side modem 72 through these equipments. Thus, a communication line is connected to the center side modem 72 to enable communication with the center side CPU 91.

The contents of data transmitted from the CPU 11 to the CPU 91 on the center side through the communication line (data for controlling the copying machine 4) are determined by a type of a transmission flag set to "1" as will be described later.

(Center)

It is a computer apparatus which is connected to the communication terminal device 72 so that it can be connected to each of data terminals 1 at a large number of users through the communication network. Copying machines 4 corresponding to data terminals 1 of a large number of users are diagnosed and controlled by the CPU 91 at the center, respectively.

Figures 23, 24:
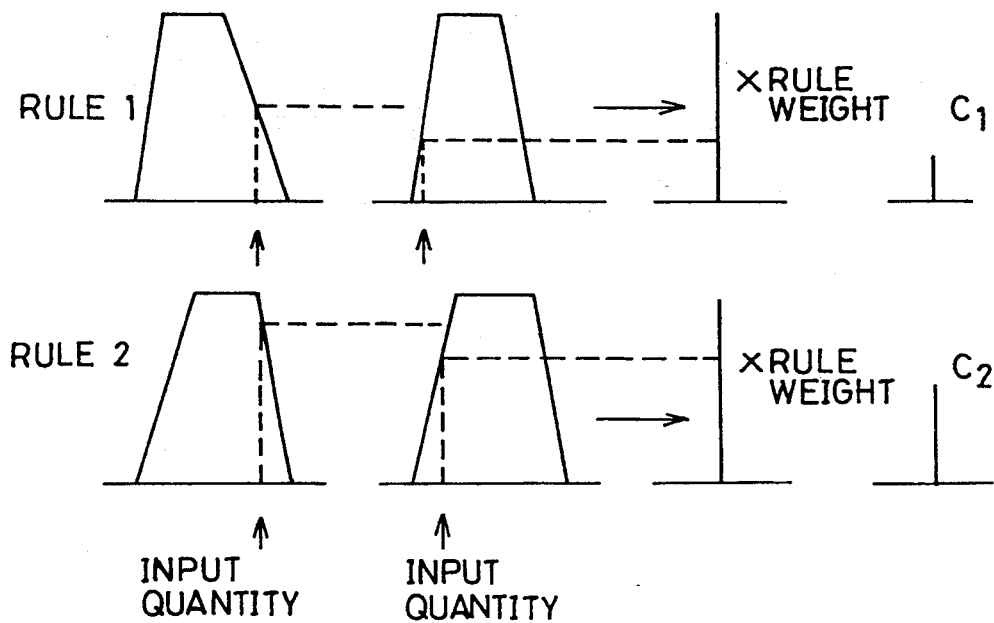
FIG. 23 is a descriptive diagram illustrating further example of a displaying manner in the display at the center of FIG. 1.
FIG. 24 is a descriptive diagram of an expert system used in one embodiment of the present invention.

For example, when data (element data, count data, and the like) is inputted from the data terminal 1 to the CPU 91 through the communication network, the modem 72, the communication I/F (RS323CI/F) 71 on the modem 72 side, and a communication I/F (RS232CI/F) 98 on the CPU 91 side, conditions of a copying machine connected to that data terminal 1 are diagnosed on the basis of the data. That is, referring to knowledge base, a cause and a measure to be taken for the trouble of that copying machine, and a possibility thereof are operated, and displayed as shown in FIGS. 21 through 23, for example. Also, as a result of the diagnosis, if it is determined that settings of that copying machine must be changed, or that it is necessary to have the copying machine execute a predetermined operation, data indicating the information is transmitted to the data terminal side.

Furthermore, at the end of month, an amount of charge to be asked is calculated on the basis of the data and a bill is printed out.

[2] System Control

Next, control of the system will be described.

Before the description, the terms "on-edge" and "off-edge" will be defined. A conditional change from an off state to an on state of states of a switch, a sensor, a signal and the like is defined as an on-edge. A conditional change from an on state to an off state of a switch, a sensor, a signal and the like is defined as an off-edge.

(Processings in Copying Machine 4)

Figure 6:
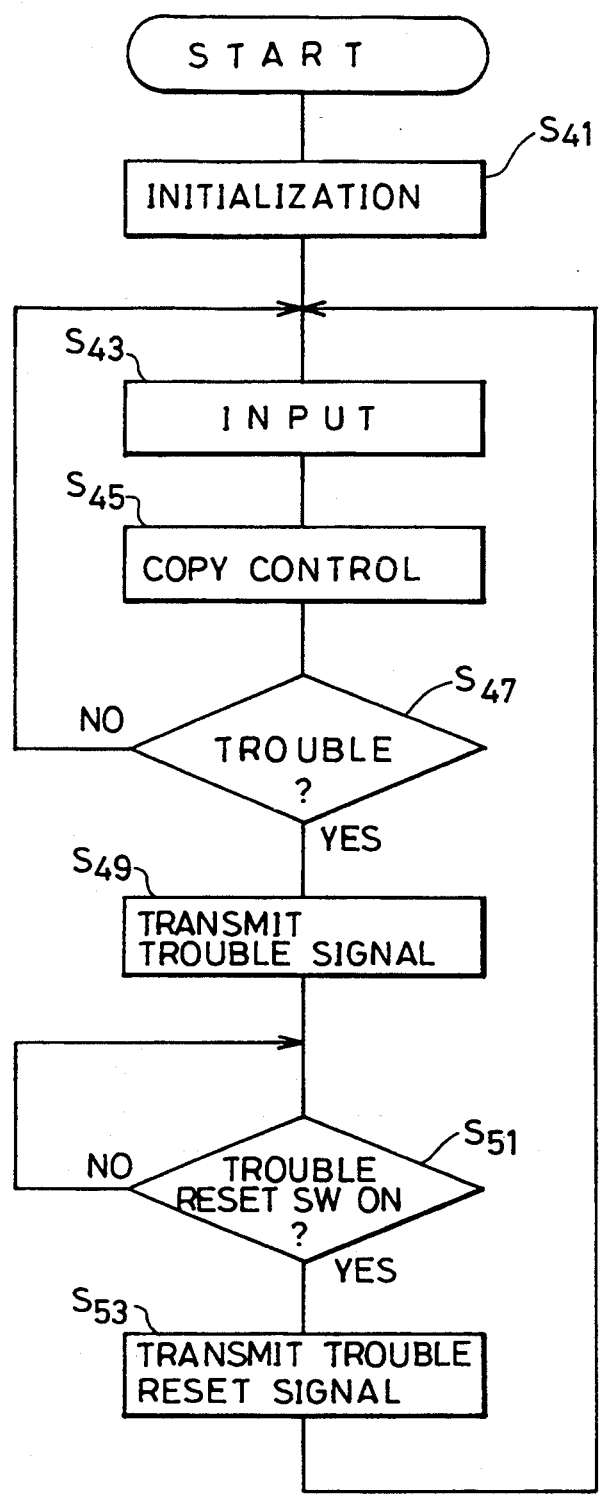
FIG. 6 is a flow chart illustrating a main routine of processing by a CPU of the copying machine in FIG. 2.

Processings in the CPU 41 of the copying machine 4 will be described referring to the flow chart of FIG. 6.

In the CPU 41, for example, processings are started by turn-on of a power supply, and initialization is achieved (S41) such as clearing of memories, setting of a standard mode and the like. Next, processes in steps S43 and S45 are repeated.

Step S43 is a step for collectively indicating processes for accepting various kinds of input signals. The input signals include input signals from the key switch groups on the operation panel 40 and the sensor groups 45 at various parts in the copying machine, or a command for changing copying machine set conditions sent from the data terminal 1, a command requiring operation and the like (refer to FIGS. 27-29).

Step S45 is a step collectively illustrating processings which are necessary for copying operation and the like. For example, it includes controls of various operating unit groups 44 such as paper-supply control, scanning control, photoreceptor drum control, developer control, or processes such as change of setting on the basis of the above-mentioned commands from the data terminal and the like.

If a JAM or a trouble takes place, (YES in S47), a signal corresponding to that trouble or the like is transmitted to the CPU 11 (S49). Furthermore, when a trouble reset switch 49 is operated by an operator or the like (YES in S51), a trouble reset signal is transmitted to the CPU 11 (S53). In the CPU 11, processes described below are carried out accordingly.

(Processes in Date Terminal 1)

Processes in the CPU 11 of data terminal 1 will be described referring to flow charts shown in FIGS. 7–15.

(a) Main routine

Figure 7:
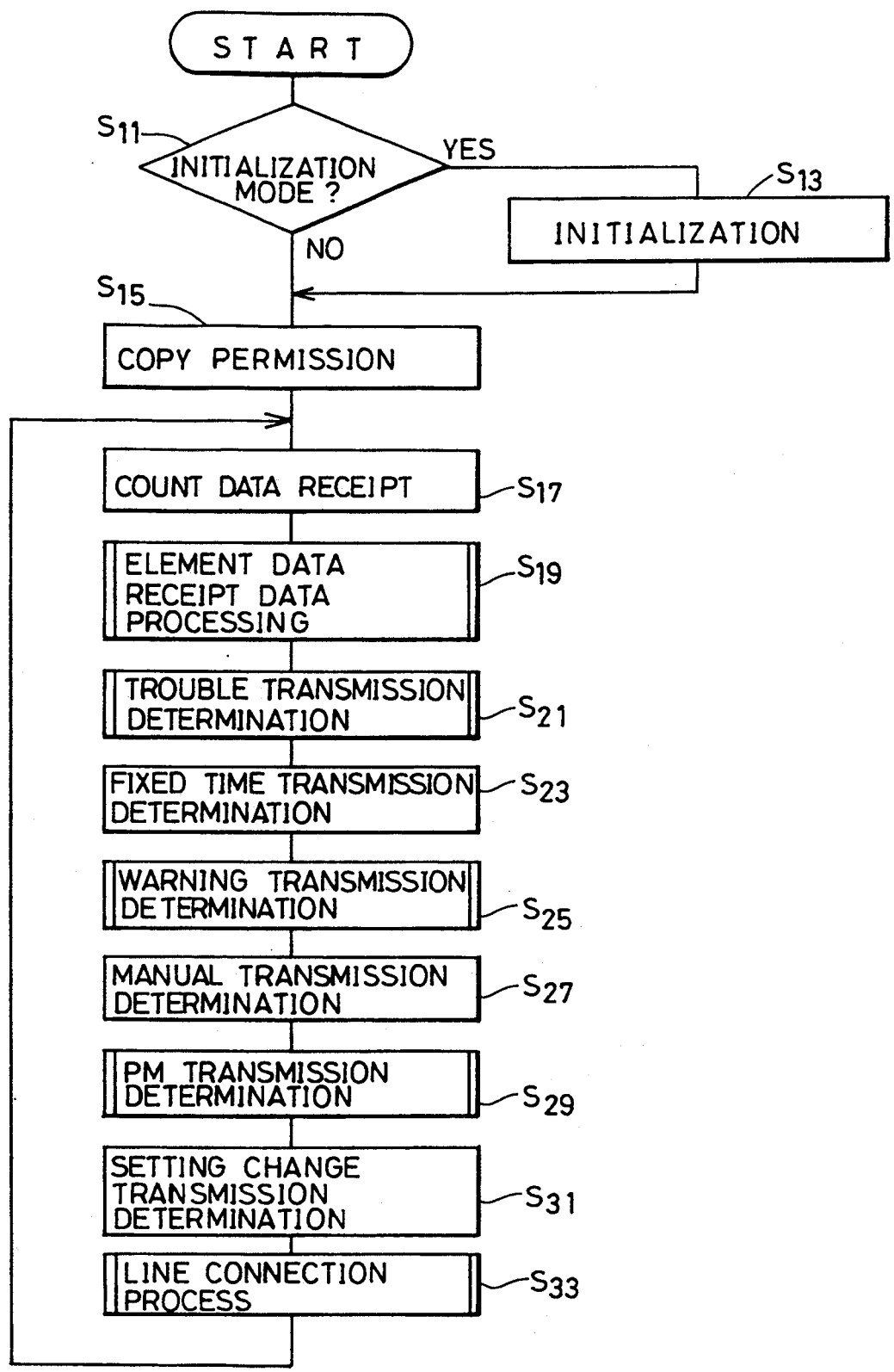
FIG. 7 is a flow chart illustrating a main routine of processings by a CPU of the data terminal of FIG. 2.

On the basis of the main routine of FIG. 7, the outline of the processes will be described.

The processes are started by turn-on of the power supply in CPU 11. If an initialization mode is set (YES in S11), an initialization process (S13) is carried out and then a copy permitting signal is transmitted to the CPU 41 of copying machine (S15). If an initialization mode is not set (NO, S11), a copy permitting signal is immediately transmitted (S15) and the repeating processes in steps S17–S33 are carried out.

Schematically, the following processes are conducted in respective subroutines.

*Initialization: S13

If the dip switch DIP-SW4 is on when the process is started, that is, if the initialization mode is set (YES in S11), it is executed. A selection number (a telephone number) of the center, an ID number (DTID) of the data terminal, an ID number (center ID) of the center are set, and initialization transmission is realized.

* Count data reception: S17

Receiving processes are performed for various kinds of count data sent from the CPU 41. The contents of data include a discharge code, a JAM-trouble code, a JAM-trouble count value, a count value by paper size, a PM count value. In the CPU 11, these data are updated to the latest values and held.

* Element data reception-data processing: S19

As will be described later, average values of element data and data corresponding to standard deviation are operated and updated to the latest values.

* Trouble transmission determination: S21

As will be described later, determinations are made as to whether trouble data, trouble recovery data should be transmitted to the center side or not, for example.

* Fixed time transmission determination: S23

When a predetermined fixed time transmission time is attained, a fixed time transmission flag is set to 1. This allows various kinds of count data and various kinds of element data to be sent to the center.

After the transmission is finished, fixed time transmission time data for the next time, current time data, closing date data of bill are transmitted from the center side.

* Warning transmission determination: S25

As will be described later, element data, a count value of JAM counter, a count value of PM counter are compared with predetermined threshold values, respectively.

Also, on the basis of results of the comparison, a determination is made as to whether warning data, warning recovery data should be transmitted to the center or not.

* Manual transmission determination: S27

When it is not in the initialization mode, if the push switch 21 is turned on, a manual transmission flag is set to 1. Thus, various kinds of element data are transmitted to the center.

* PM transmission determination: S29

As will be described later, a count value before clearing of a PM counter in which a count value is cleared to "0" by parts exchange is transmitted to the center.

* Setting change transmission determination: S31

In the case where on the basis of diagnosis on the center side, an instruction is given to change specific setting in the copying machine from the center side and it is changed accordingly, a setting change transmission flag is set to 1 when the first copying operation is performed. It enables various kinds of data after the change of settings to be sent to the center side.

* Line connection process: S33

As will be described later, when any transmission flag is set to "1", the modem 52 is activated and a process of connecting a communication line to the center side is carried out. Furthermore, after the communication line is connected, data communication is effected with the CPU 91 on the center side.

(b) Subroutine

Next, details of respective subroutines will be described referring to FIGS. 8–15.

Figure 8:
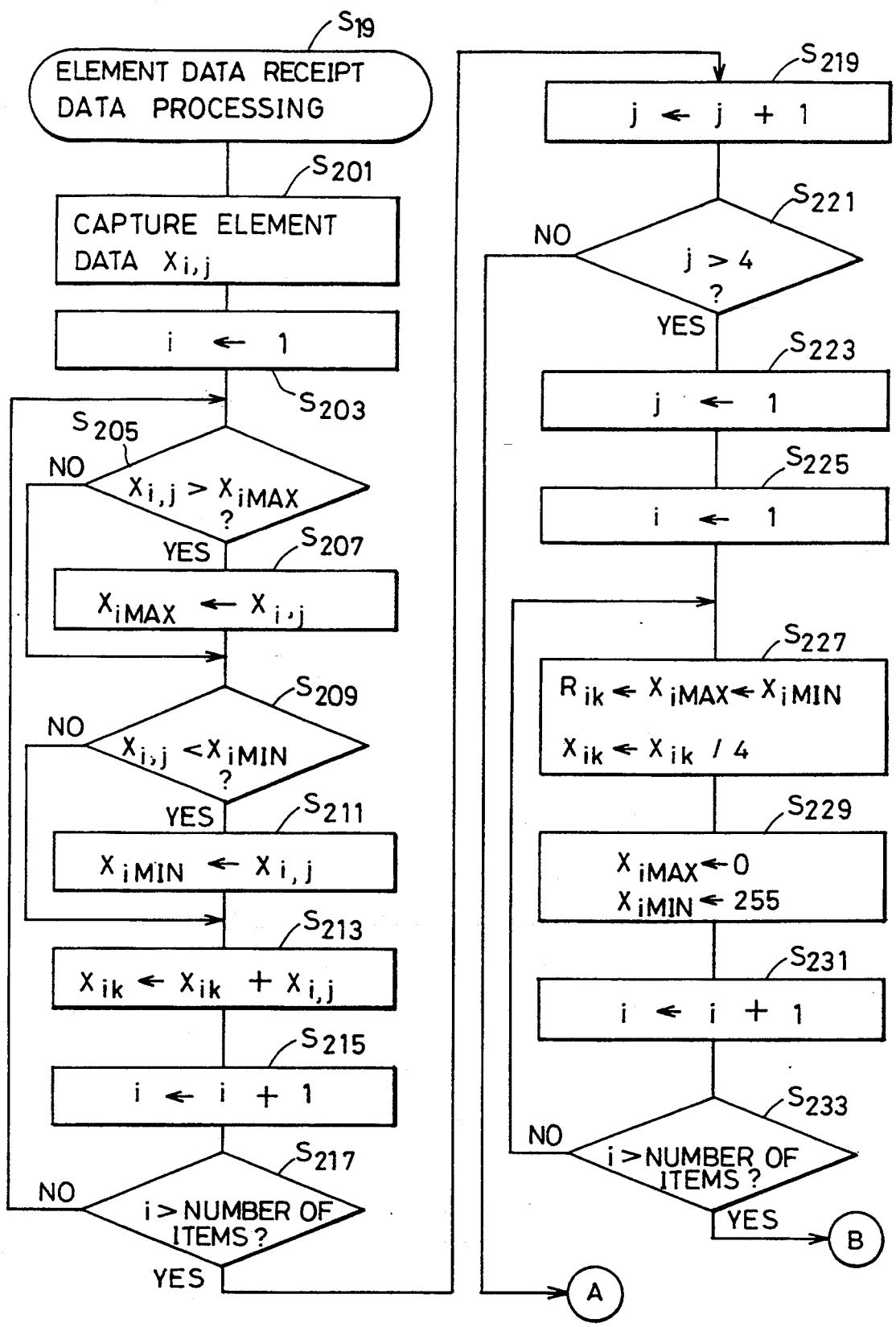
FIG. 8 is a flow chart illustrating a part of the element data reception-data processing in the flow chart of FIG. 7.
Figure 9:
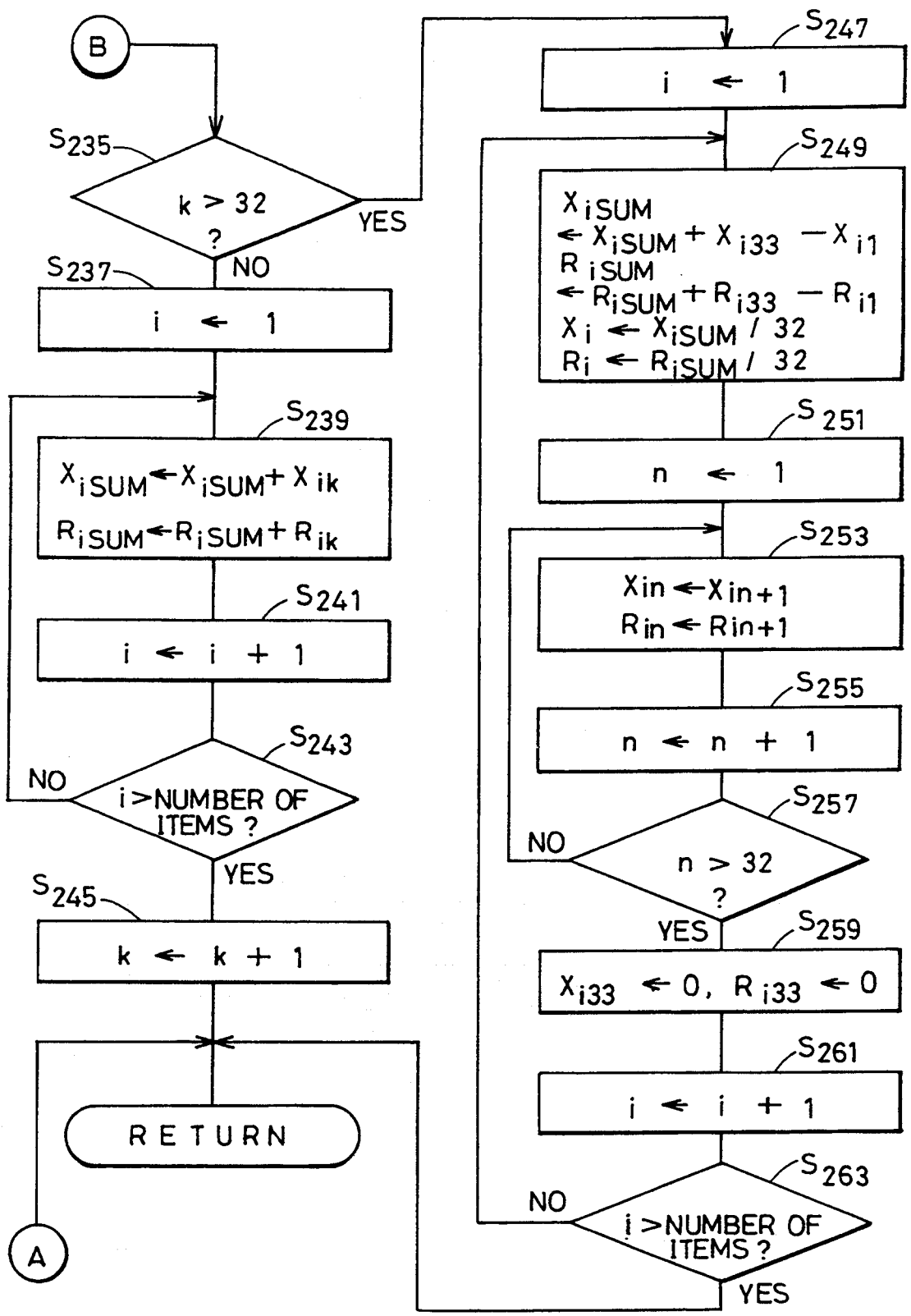
FIG. 9 is a flow chart illustrating remaining parts of the element data reception-data processing in the flow chart of FIG. 7.

* Element data reception and the like (FIGS. 8 and 9)

In this subroutine, on the basis of element data transmitted from the copying machine, data for comparison with threshold values (warning transmission determination; refer to FIGS. 11 and 12) are operated.

First, element data group $X_{i,j}$ transmitted from the copying machine every time copying paper is discharged is taken in from the serial I/F13 (S201). The subscript i indicates an item number of the element data and the subscript j indicates an order in each item.

Next, after an initial value 1 is substituted into the item number i (S203), a maximum value $X_{iMAX}$, a minimum value $X_{iMIN}$ and a sum $X_{iK}$ are sequentially updated for each item (S205–S217). Subsequently, the subscript j is incremented (S219), and it returns to the main routine.

Thus, when the processes in steps S201–S217 have been carried out four times for every item (YES in S221), after the subscript j is reset to 1 (S223), an initial value 1 is substituted into the item number i (S225), and a difference $R_{iK}$ between the maximum value and the minimum value and an average value $X_{iK}$ of four data are operated, respectively (S227–S233). The step S229 is a step for giving initial values of a maximum value $X_{imax}$ and a minimum value $X_{iMIN}$ in preparation for the processes in the next steps S205–S211.

After the processes in steps S227–S233, processes in steps S237–S245 or in steps S247–S263 are performed.

Steps S237–S245 are processes to be performed when an accumulated total of processes of the steps S227–S233 does not reach thirty three times. That is, for each item, a sum $R_{iSUM}$ of difference $R_{iK}$ between said maximum value and minimum value and a sum $X_{iSUM}$ of average values $X_{ik}$ of the four data are operated for data corresponding to 32 times.

Steps S247–S263 are processes to be performed when an accumulated total of processes in the steps S227–S233 reaches 33 times or more. That is, for each item, a sum $R_{iSUM}$ of difference $R_{ik}$ between said maximum value and minimum value and a sum $X_{iSUM}$ of average values $X_{ik}$ of the four data are operated for the latest data corresponding to 32 times and also each average value $X_i$, $R_i$ is operated.

Thus, an average value $X_i$ of the latest 128 (=4×32) pieces of data and an average value of deviation (a value corresponding to the standard deviation) $R_i$ are obtained for each item of element data.

Figure 10:
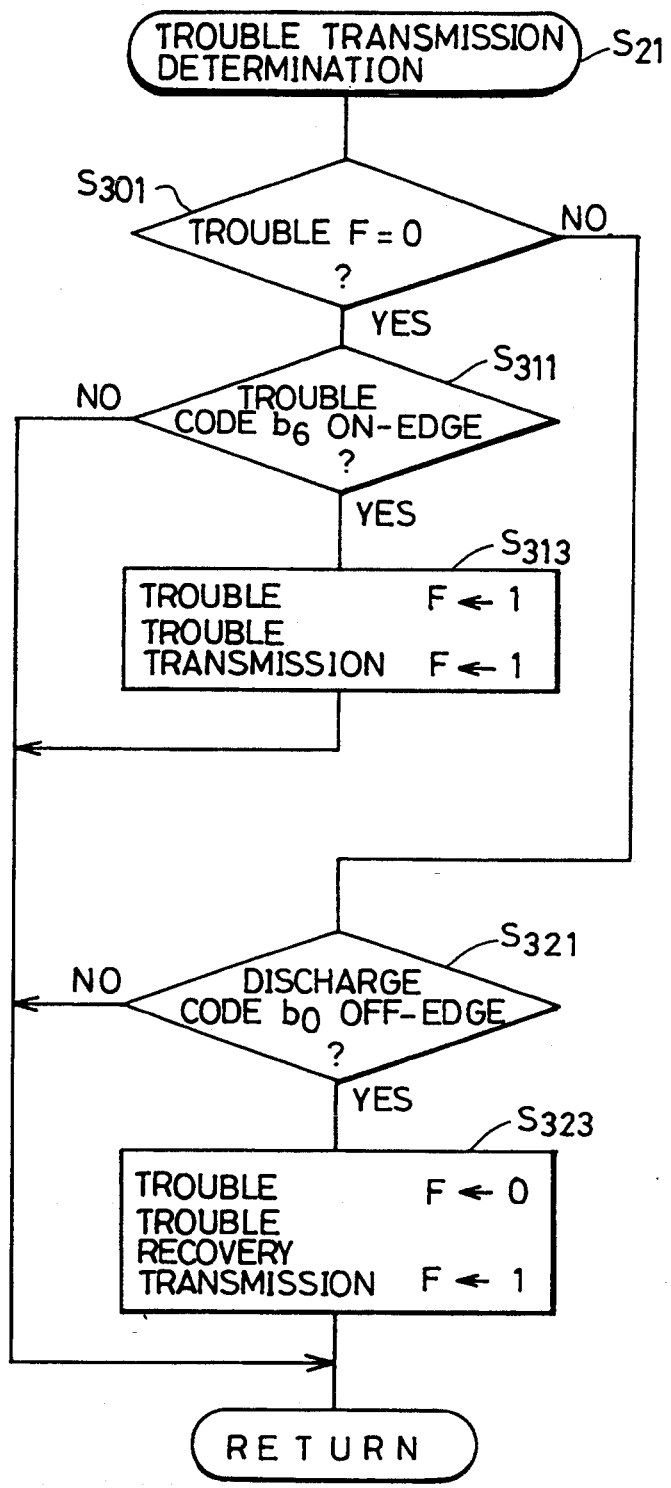
FIG. 10 is a flow chart illustrating a trouble transmission determination process in the flow chart of FIG. 7.

* Trouble transmission determination (FIG. 10)

In this process, trouble transmission and trouble recovery transmission are controlled.

For example, with "trouble flag=0" (YES in S310), if a trouble code from the copying machine is detected (YES in S311), a trouble flag and a trouble transmission flag are set to "1", respectively (S313).

Also, with "trouble flag=1" (NO in S301), if a paper discharge code from the copying machine is detected (YES in S321), a trouble flag is reset to "0", and a trouble recovery transmission flag is set to "1" (S323). This is because paper is discharged in a copying machine when a trouble is repaired.

When a trouble transmission flag or a trouble recovery transmission flag is set to "1", a line connection process (FIGS. 14 and 15) is carried out and trouble data or trouble recovery data is transmitted to the CPU 91 at the center.

Figure 11:
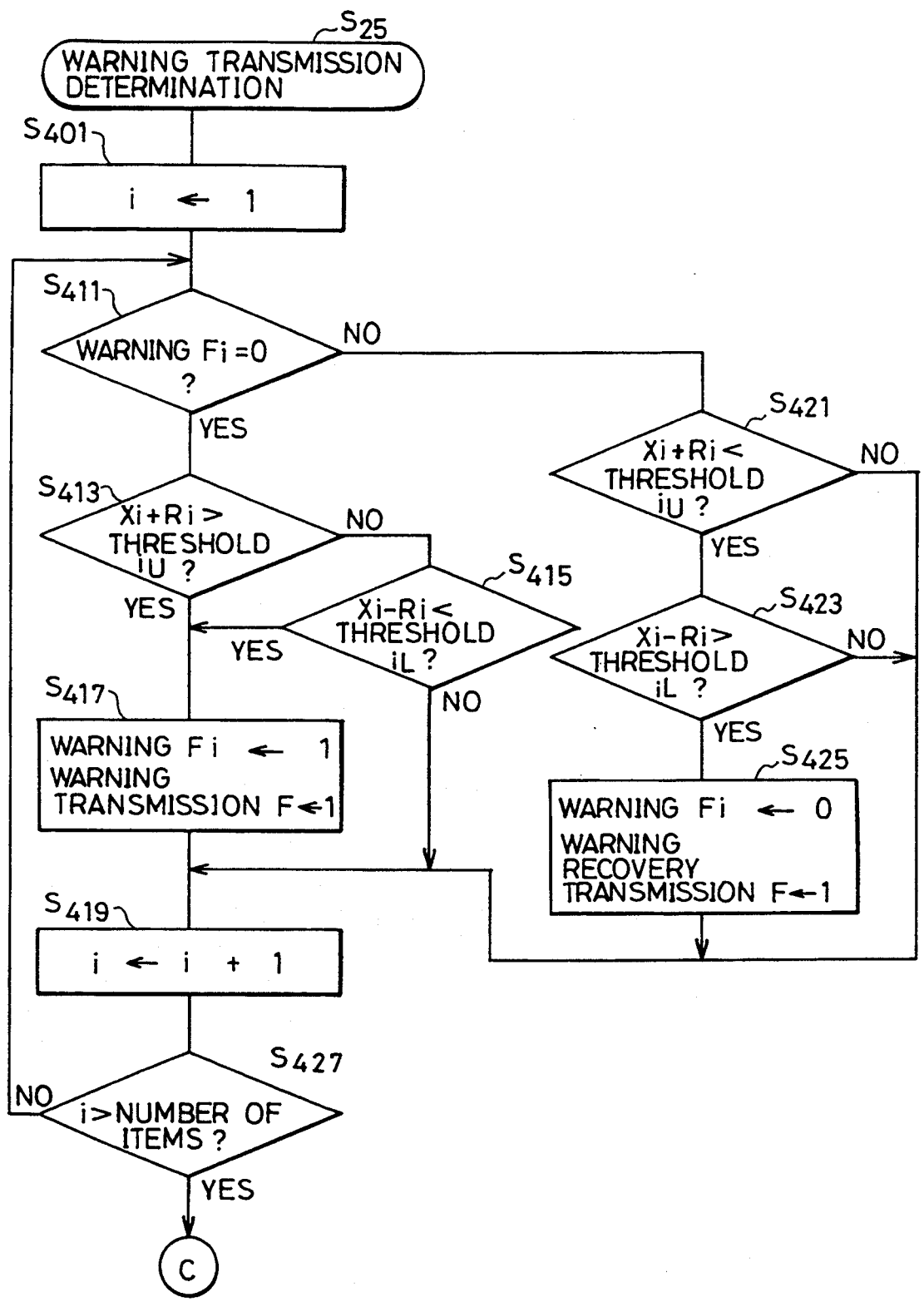
FIG. 11 is a flow chart illustrating a part of a warning transmission determination process in the flow chart of FIG. 7.
Figure 12:
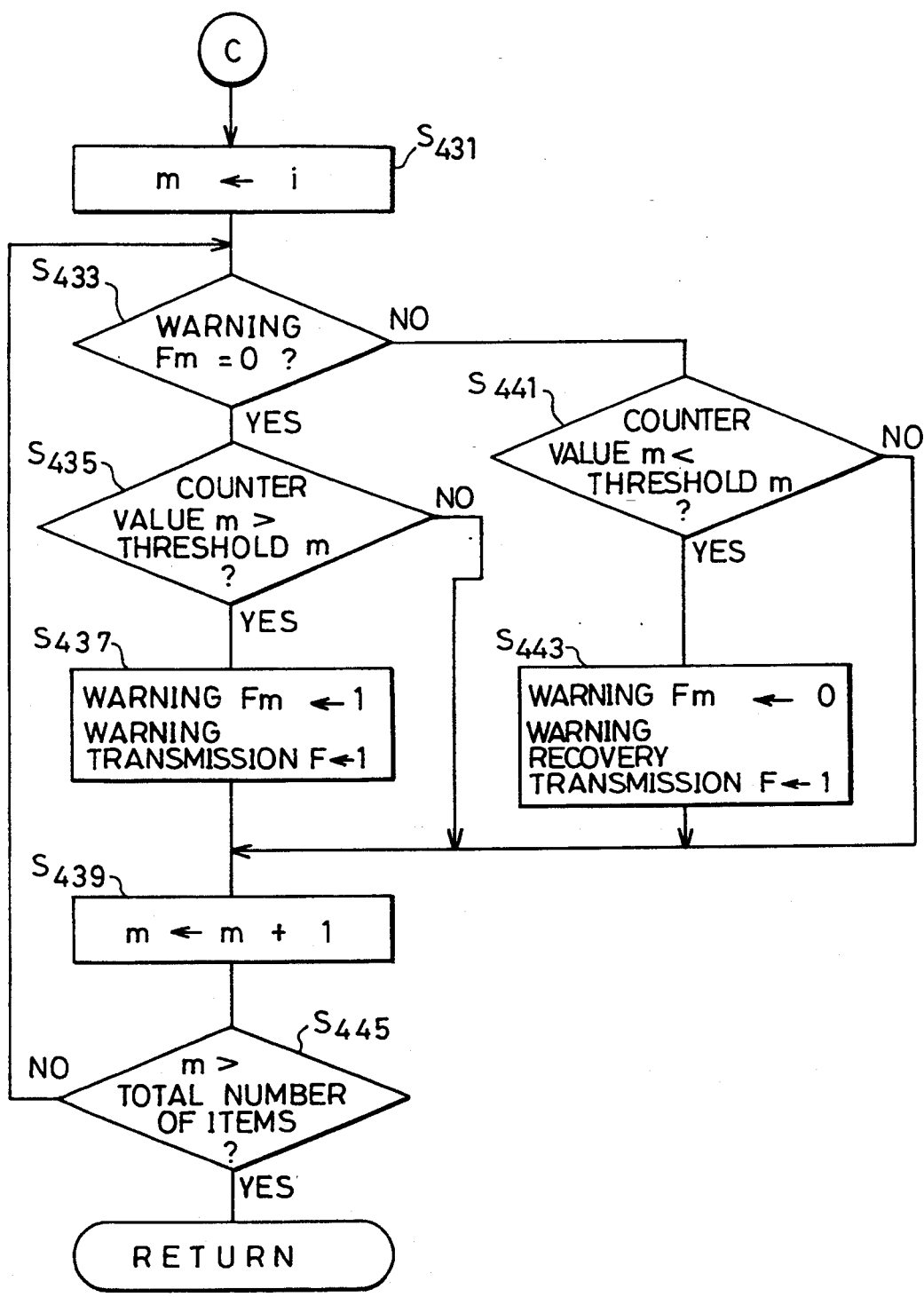
FIG. 12 is a flow chart illustrating remaining parts of the warning transmission determination process in the flow chart of FIG. 7.

* Warning transmission determination (FIGS. 11 and 12)

In this process, warning transmission and the like are managed.

Steps S401–427 are processes for making warning transmission when a value of element data gets out of a peculiar permittable range, or warning recovery transmission when it comes back into the permittable range.

First, an initial value "1" is set as the item number i indicating a type of element data (S401).

Next, in steps S411, a warning flag related to element data specified by the item number i (the first item of element data at the first time) is examined. As a result, if a warning flag related to that element data is "0" (YES in S411), a determination is made as to whether a value of that element data is within a permittable range peculiar to that element data or not, in other words whether it is in a range of not more than an upper limit threshold value iU and not less than a lower limitation threshold value iL or not. If it is out of the permittable range (YES in S413 or YES in S415), a warning flag $F_i$ related to that element data and a warning transmission flag are set to "1", respectively (S417). The line connection process (FIGS. 14 and 15) is thus effected and warning data is transmitted to the center.

On the other hand, in step S411, if a warning flag of element data specified by the item number i is at "1" (NO in S411), a determination is made as to whether a value of that element data has come back into the permittable range or not, and when it has (YES in S421, and YES in S423), a warning flag $F_i$ related to that element data is reset to "0" and a warning recovery transmission flag is set to "1" (S425). Thus, the line connection process (FIGS. 14 and 15) is conducted and warning recovery data are transmitted to the center.

When such processes have been effected with respect to all the element data (YES in S427), processes after steps S431 are performed.

Steps S431–445 are processes for making warning transmission when count values (=frequency) of JAM counter and PM counter exceed peculiar threshold values, or making warning recovery transmission when they attain values not larger than threshold values, respectively.

First, an initial value "i (a value of the final item number of element data +1)" is set in the item number m indicating a type of JAM counter and PM counter (S431).

Next, a warning flag related to JAM counter or PM counter specified by the item number m is checked in step S433. As a result, if a warning flag related to that JAM counter or PM counter is at "0" (YES in S433), a determination is made as to whether the count value is within a permittable range peculiar to that counter or not, that is, whether it exceeds a threshold value m or not. When it exceeds the value (YES in S435), a warning flag $F_m$ about that counter and a warning transmission flag are set to "1", respectively (S437). The line connection process (FIGS. 14 and 15) is carried out correspondingly, and warning data are transmitted to the CPU 91 at the center.

On the other hand, if a warning flag related to JAM counter or PM counter specified by the item number m is at "1" in the step S433 (NO in S433), a determination is made as to whether the count value has return equal to or below the threshold value or not, and when it has returned (YES in S411), a warning flag $F_m$ related to that counter is reset to "0", and a warning recovery transmission flag is set to "1". The line connection process (FIGS. 14 and 15) is performed correspondingly, and warning recovery data is transmitted to the CPU 91 at the center.

When the processes above have been finished with respect to all the count data (YES in S445), it returns to the main routine. The warning transmission and the warning recovery transmission are controlled as described above.

Figure 13:
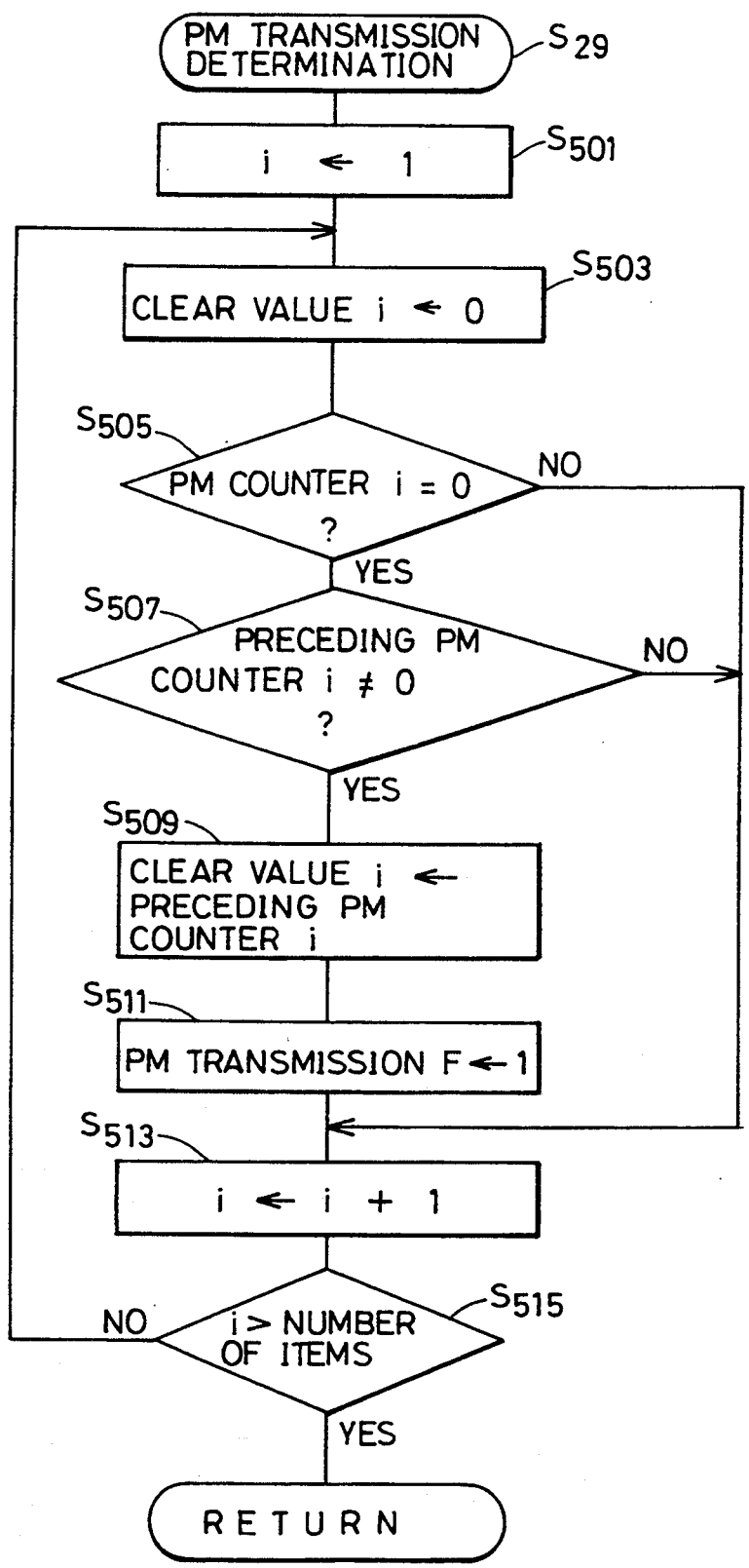
FIG. 13 is a flow chart illustrating a PM transmission determination process in the flow chart of FIG. 7.

* PM transmission determination (FIG. 13)

In this process, PM transmission is controlled.

First, an initial value "1" is set to an item number i indicating a type of PM counter (S501). Next, processes in steps S503–S511 are executed, and then a value of i is incremented (S513) and the above processes are repeated. That is to say, changing types of PM counters, the above-described processes are repeated.

Steps S503–S511 are a process for retaining a count value immediately before clearing a PM counter (S509) and setting a PM transmission flag to "1" (S511) when the PM counter is cleared (YES in S505 and YES in S507). The PM counter is cleared by a service man when parts corresponding to that PM counter are exchanged.

If "PM transmission flag =1" (S511), the line connection process (FIGS. 14 and 15) is carried out and PM data (a type of an exchanged part, a count value immediately before the exchange) is transmitted to the center.

Figure 14:
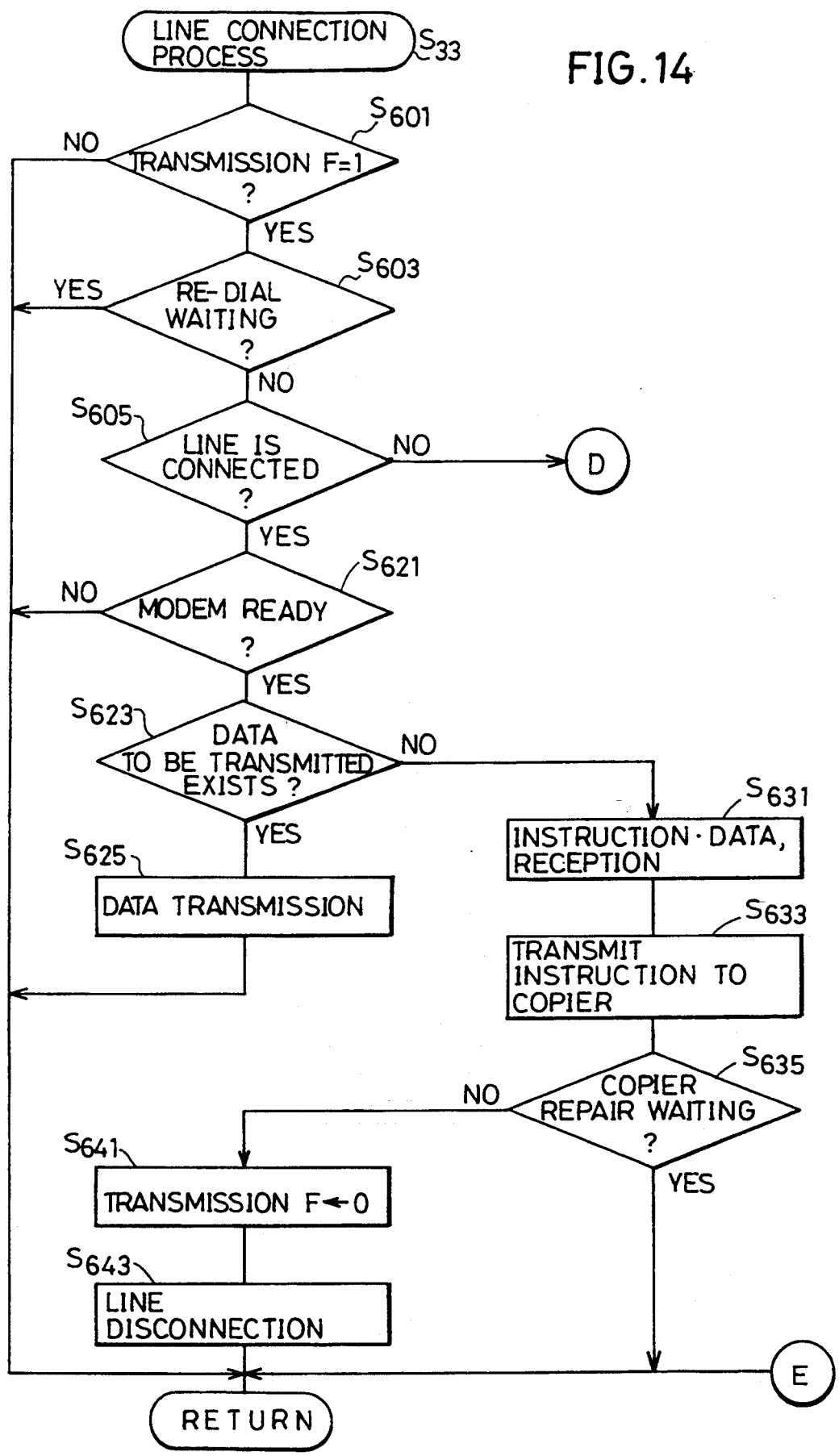
FIG. 14 is a flow chart illustrating a part of a line connection process in the flow chart of FIG. 7.
Figure 15:
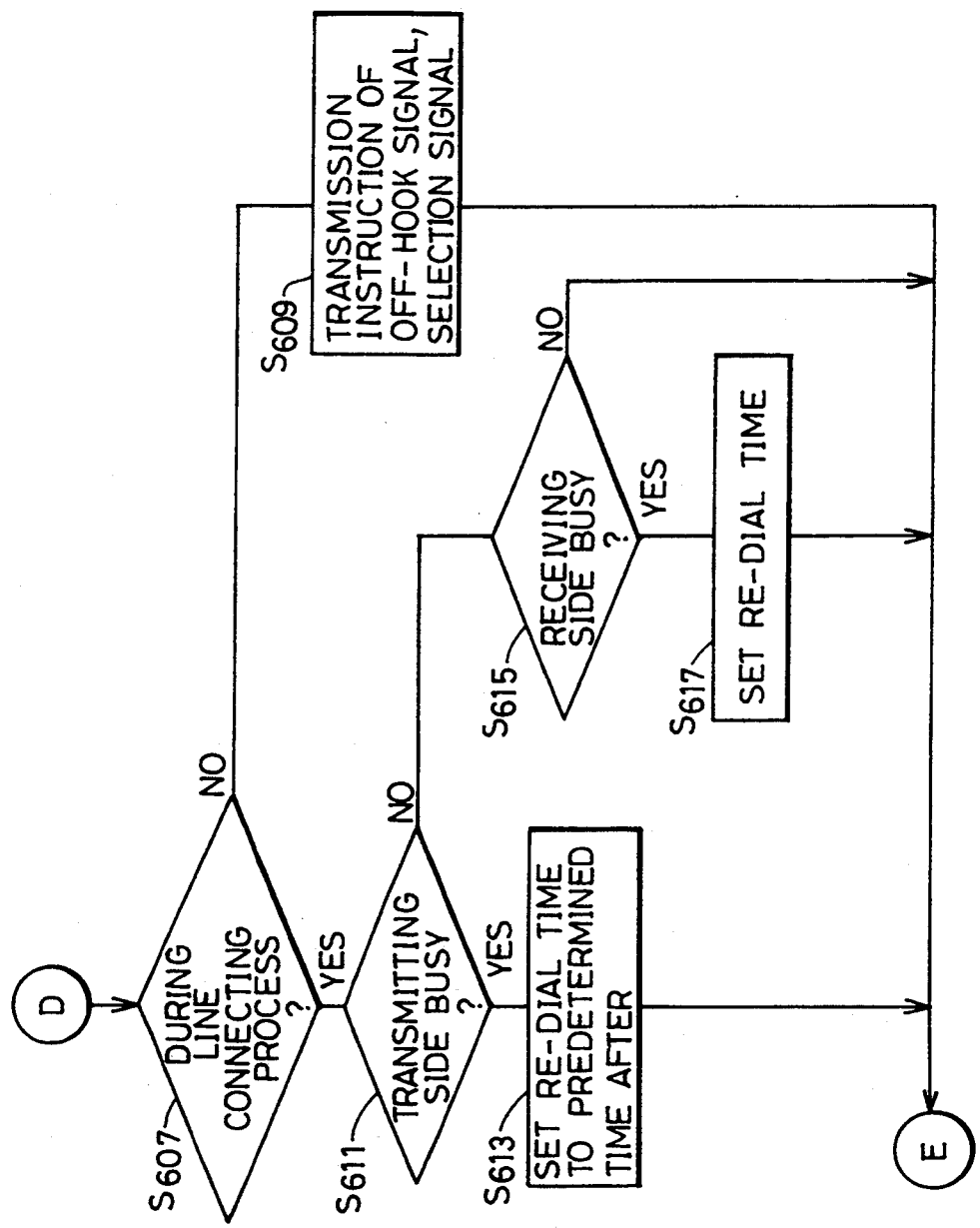
FIG. 15 is a flow chart illustrating remaining parts of the line connection process in the flow chart of FIG. 7.

* Line connection process (FIGS. 14 and 15)

In this process, a process of calling the center is performed corresponding to "any transmission flag =1", and after the communication line is connected, data corresponding to that transmission flag is transmitted. Furthermore, data communication is made with the CPU 91 on the center side.

First, if any transmission flag is set to "1" (YES in S601), under conditions that it is not in a re-dial standby (NO in S603), the communication line is not connected with the center side modem 72 (NO in S605), and that it is not in standby after an instruction is given to the modem 52 to call the center side modem 72 (NO in S607), an instruction is given to the modem 52 to call the center side modem 72 (S609).

As a result of the process in the step S609, if the telephone machine 53 is "in use" and a call cannot be made to the center side modem 72 (YES in S611), a time after a predetermined time period is set as a re-dial time (S613). Thus, the determination in the step S603 is "YES" until the re-dial time is reached. That is, the process in the step S609 is not performed. At the re-dial time, an instruction is given to the modem again to call the center side modem 72 (S609).

Also when it is found out that the center side modem 72 is "busy (including a case in which even a connection is made with the modem 72, there is no response from the CPU 91)" (YES in S615) as a result of transmission of a selection signal of the center to the communication network from the modem 52 in accordance with the process in the step S609, a re-dial time is set similarly to the above description (S617), and the process of the S609 is carried out again at the set re-dial time.

In accordance with the process in the step S609, when a selection signal of the center is transmitted from the modem 52 to the communication network, and as a result, the communication line is connected with the center side modem 72 (YES in S605), after standby of ready of the modem 52 (YES in S621), data corresponding to a transmission flag which is set to "1" is transmitted to the center side (S625).

Figure 18:
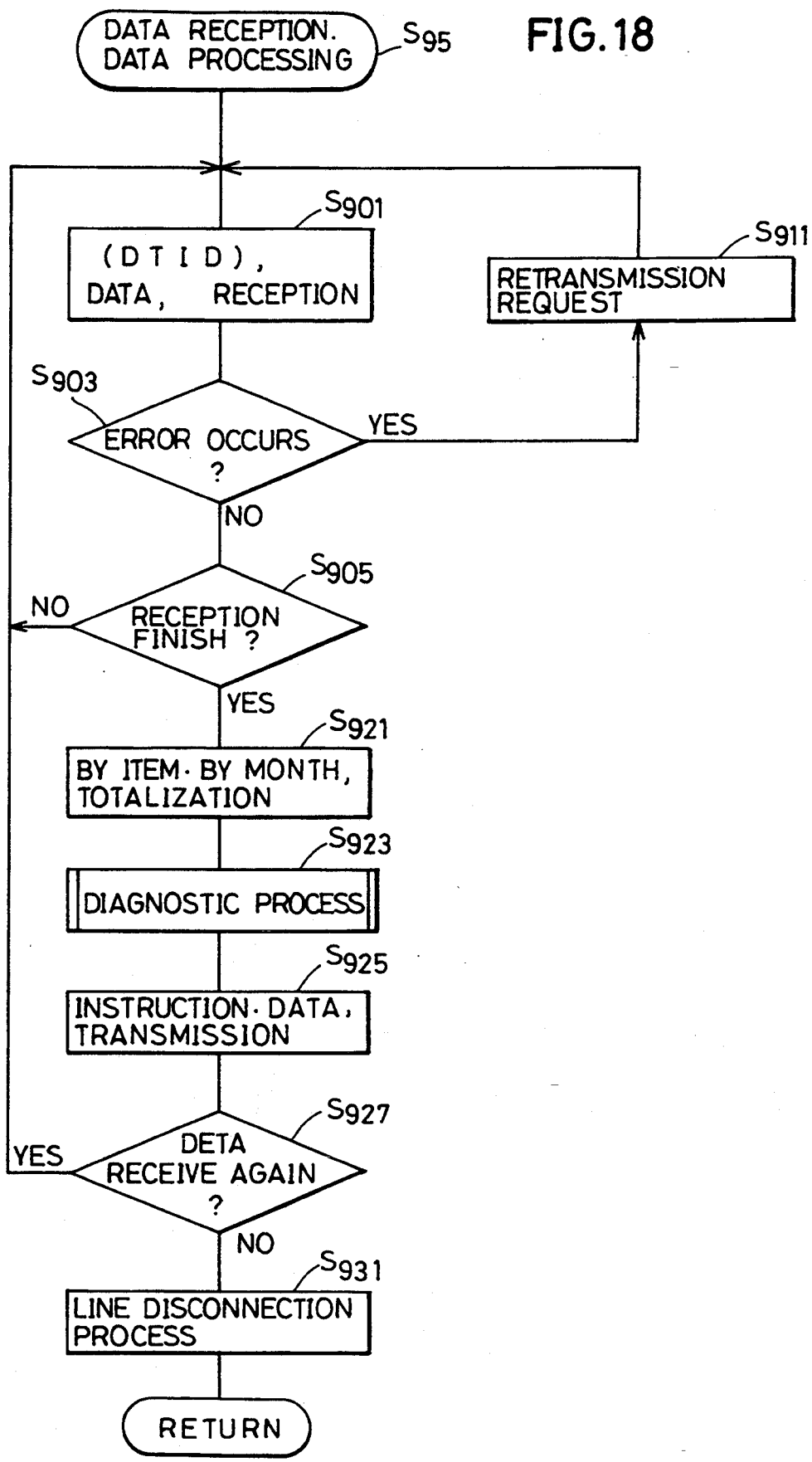
FIG. 18 is a flow chart illustrating still other processings by the CPU at the center in the control system of FIG. 3.

Next, when there is no data to be transmitted to the center (NO in S623), data transmitted from the center side is received (S631: refer to S925 of FIG. 18).

The received data includes, for example, an instruction for changing set conditions of a copying machine (setting change instruction), an instruction for requiring operation of copying machine (operation instruction), or, fixed time transmission date for the next time, present time, closing date data and the like. When a communication error takes place, a retransmission instruction of data is received (refer to FIG. 18, S911).

When a setting change instruction or an operation instruction is received in step S631, a command and parameter corresponding to that instruction (refer to FIG. 27) are transmitted to the CPU 41 through the serial. I/F 12 and the serial I/F42 (S633).

The setting change command includes a number corresponding to a set item, and a number corresponding to a set value of that item, as shown in FIG. 28. Also, the operation command includes a number corresponding to operation as shown in FIG. 29.

As shown in FIGS. 28 and 29, all the modes which can be set with operational input from the operation panel 42 of copying machine and all operations which can be instructed can be set in a copying machine by the above-mentioned instruction signals (setting change instruction, operation instruction) from the centralized control unit side, or can be instructed. Such as "operation of developing motor only" (FIG. 29, No. 4), only a specific load of copying machine can be operated.

On the copying machine 4 side, as described above, in step S43 of FIG. 6, a process corresponding to the command is executed.

When data from the center side is received as described above, if the data requires standby of process in copying machine 4 (YES in S635), the communication line is held as it is. The case under which an end of process in copying machine 4 must be stood by includes a case when a result can be immediately obtained such as when a developer is operated to detect toner concentration, for example.

If transmission data is given from the copying machine side after the standby (YES in S623), data is transmitted to the center again (S625).

On the other hand, when there is no need of standing-by an end of process of copying machine (NO in S635), a transmission flag is reset to "0" (S641), and subsequently the communication line is disconnected (S643). As described above, by the line connection process, communication with the center is made.

(Processes in center)

Next, processings in the CPU 91 provided in the computer 90 at the center will be described referring to FIGS. 16–19.

Figure 16:
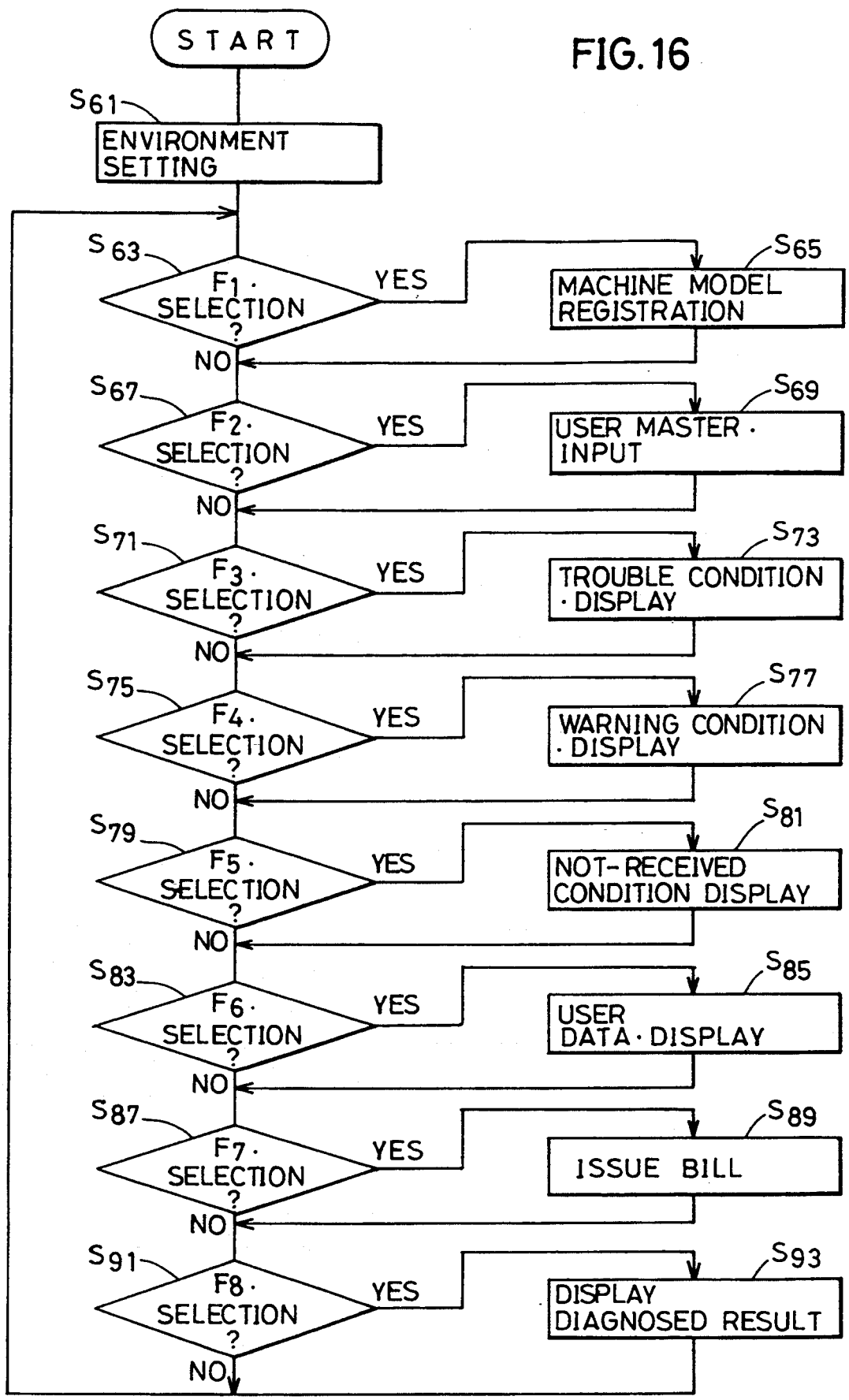
FIG. 16 is a flow chart illustrating processing in a CPU of a center in the control system of FIG. 3.

(a) F1–F8 key processings (FIG. 16)

The CPU 91 starts processing with turn-on of power-supply, and first performs environment setting of a modem, a printer and the like (S61). Subsequently, the following modes are set corresponding to key input operations of F1–F8, respectively, or, the following processes are performed.

. F1 key operation (YES in S63)

A receiving mode of machine model registration is set (S65). That is, new registrations are accepted such as a machine model name, the number of items of element data, names of each of element data, a standard threshold value of each element data, standard threshold values of respective count data and the like.

. F2 key operation (YES in S67)

A user master registration accepting mode is set (S69). That is, a novel registrations are accepted, such as a name of user, address, telephone number, machine model name, machine number, fixed time transmission date and the like. Also, a DTID is automatically set.

. F3 key operation (YES in S71).

The trouble conditions are displayed (S73). That is, information of a user of a copying machine from which trouble transmission is made (name of user, address, telephone number, machine model name), date of occurrence and the like are displayed in the display 92 together with the contents of a trouble. In no connection with operation of F3 key, the number of occurrence of troubles is always displayed in a corner of the display 92.

. F4 key operation (YES in S75).

The warning conditions are displayed (S77). That is, information of a user of a copying machine supplied with warning transmission and the like are displayed in the display 92 together with contents of warning. In no connection with operation of F4 key, the number of cases of warning is always displayed in a corner of the display 92.

. F5 key operation (YES in S79).

The not-received conditions are displayed (S81). That is, user information of a copying machine which does not make fixed time transmission even after a predetermined fixed time transmission time is displayed in the display 92. Regardless of operation of F4 key, the number of cases of not-received is always displayed in a corner of the display 92.

. F6 key operation (YES in S83)

A user data display mode is implemented (S85). That is, when a user is selected, user information is displayed in the display 92. Also, when a sub menu is selected, count values of various counters of a copying machine of that user (a total counter, a counter by paper size, a JAM counter, a table counter, a PM counter) and element data are displayed by month or by item.

. F7 key operation (YES in S87)

A bill is printed out (S89). The printer 94 is activated and an amount of charge asked which is calculated on the basis of a count value of total counter and a predetermined expression is printed out.

. F8 key operation (YES in S91)

A cause of trouble, measures to be taken and a possibility thereof operated by the diagnostic process (FIG. 18, S923; described later) are displayed (S93).

First, as shown in FIG. 21, causes of troubles of respective users with the maximum possibilities are displayed together with measures to be taken, and possibilities in an order starting with a user with bigger possibility.

Next, when a user is selected in the image of FIG. 21, as shown in FIG. 22, all of causes of troubles about that user are displayed together with rules to be applied to in the order of higher possibilities. However, a cause of trouble with a possibility of 0 is not displayed. The rules will be described later (refer to FIGS. 25 and 26).

Also, as shown in FIG. 23, by selecting displayed candidates of various conditions related to a main body and an image of a copying machine, and taking into consideration the selected condition, re-calculation and re-display of causes of trouble and the like are made.

Figure 17:
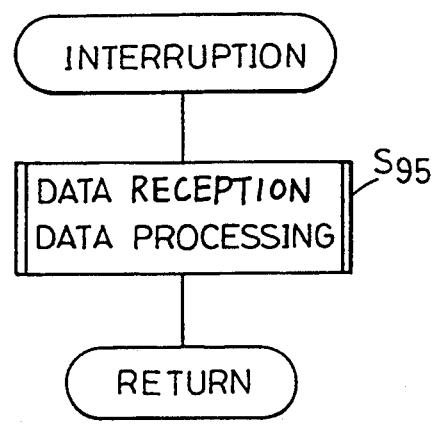
FIG. 17 is a flow chart illustrating other processings by the CPU of the center in the control system of FIG. 3.

(b) Interruption process (FIGS. 17 and 18)

The CPU 91 receives data transmitted from the data terminal side by an interruption process and also applies predetermined processes to the received data (S95).

When an interruption takes place from the data terminal side, first, receiving process of DTID and data are performed (S901). When a communication error occurs (YES in S903), retransmission of data to the data terminal side is requested (S911).

When the receiving process is finished (YES in S905), totalization is made by item and by month and data for image display by the operator's selection (refer to FIG. 16) are produced (S921).

Next, the diagnostic process (S923) is executed. The diagnostic process will be described later.

As a result of the diagnosis, when a possibility of a measure of changing set conditions of copying machine (for example, control toner concentration and the like) is high (for example, equal to or larger than 0.8), data indicating the same (setting change instruction) is transmitted to that data terminal (S925). Thus, the data terminal transmits a command to the copying machine (refer to FIG. 14, S633), and makes the above-mentioned set conditions changed (refer to FIG. 6, S43–S45). Furthermore, in order to confirm effect of the change of setting, an instruction for effecting above-described setting change transmission determination (FIG. 7, S31) after the first copying operation is performed (setting change transmission instruction) is transmitted together (S925). The relationship between a possibility and contents of setting change instruction will be described later.

When a possibility of a measure of operating a copying machine (for example, all or a part of copying operation such as operation of a developer) to detect results thereof is high as a result of the diagnosis, an instruction for effecting that operation (operation instruction) is transmitted (S925).

Also, having no relation with the diagnostic result, if the communication is based on fixed time transmission, a fixed time transmission date for the next time, closing date data, and current time are transmitted (S925).

In step S925, when an operation instruction is transmitted, after the operation is finished, detection data is transmitted again from the data terminal side (YES in S927), and it comes in a reception stand-by state of the data.

If operation instruction is not transmitted in step S925, a process of disconnecting the communication line is performed (S931), and the interruption process is finished.

Figure 19:
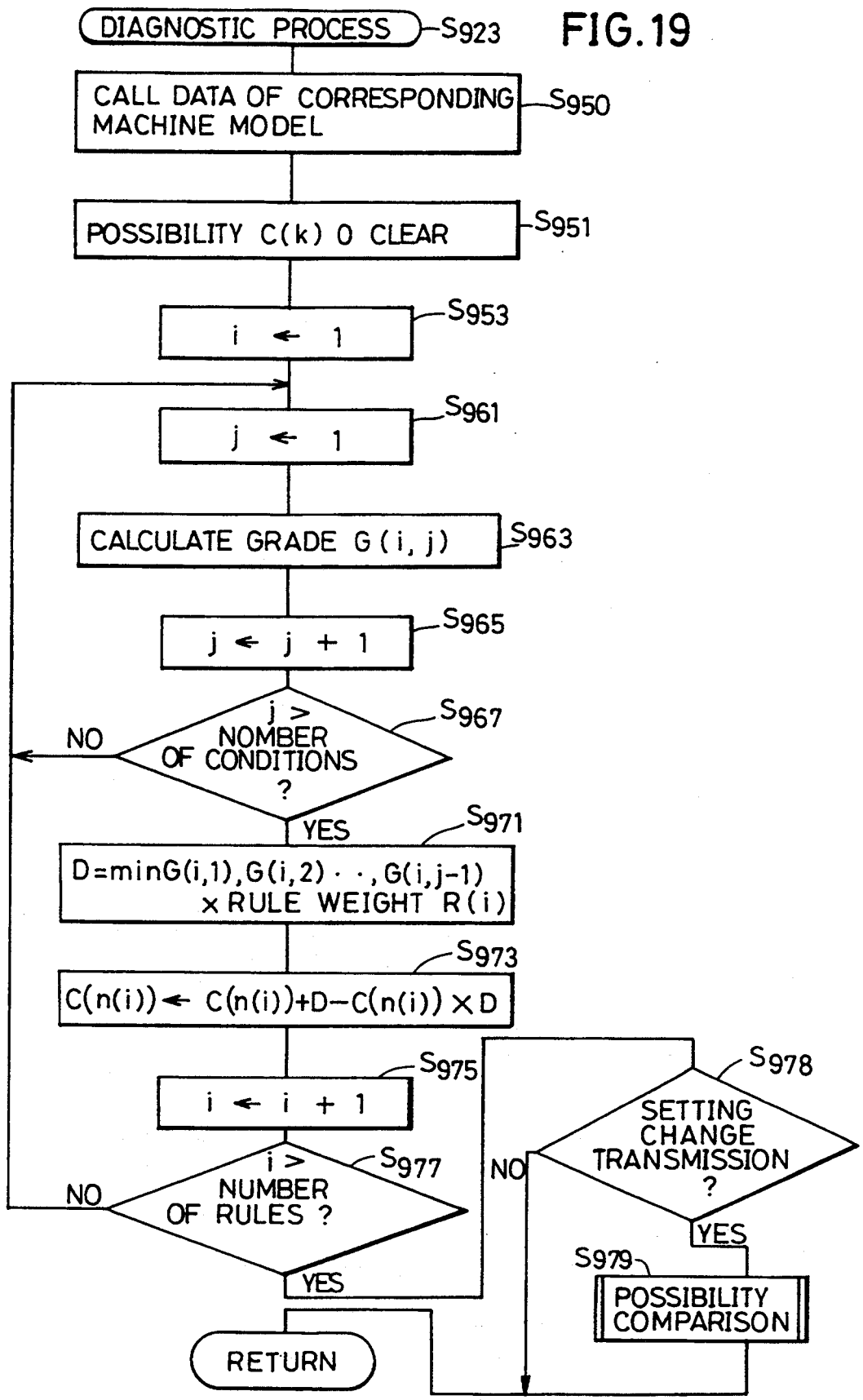
FIG. 19 is a flow chart illustrating a diagnostic process in the flow chart of FIG. 18.

* Diagnostic process (FIG. 19)

Referring to FIGS. 19, 20, 24 to 26, a description will be given on the above-mentioned diagnostic process (S923).

The diagnosis is made by such fuzzy reasoning as shown in FIG. 24. FIG. 24 shows a case in which there are two rules.

That is, with respect to a certain trouble, first, by evaluating input data referring to respective membership functions of the condition 1 and condition 2 of the rule 1, a grade of the condition 1 and a grade of the condition 2 are obtained and a smaller one of the two grades is regarded as a grade of conclusion of rule 1. The grade of the conclusion is multiplied by a rule weight of rule 1 to find out a possibility C1 of rule 1.

Similarly, a possibility C2 of rule 2 is obtained.

Next, on the basis of the above-described possibilities C1 and C2, a composite possibility C of that trouble is calculated as follows.

$$C = C1 + (1 - C1) \times C2 = C1 + C2 - C1 \times C2$$

Figure 26:
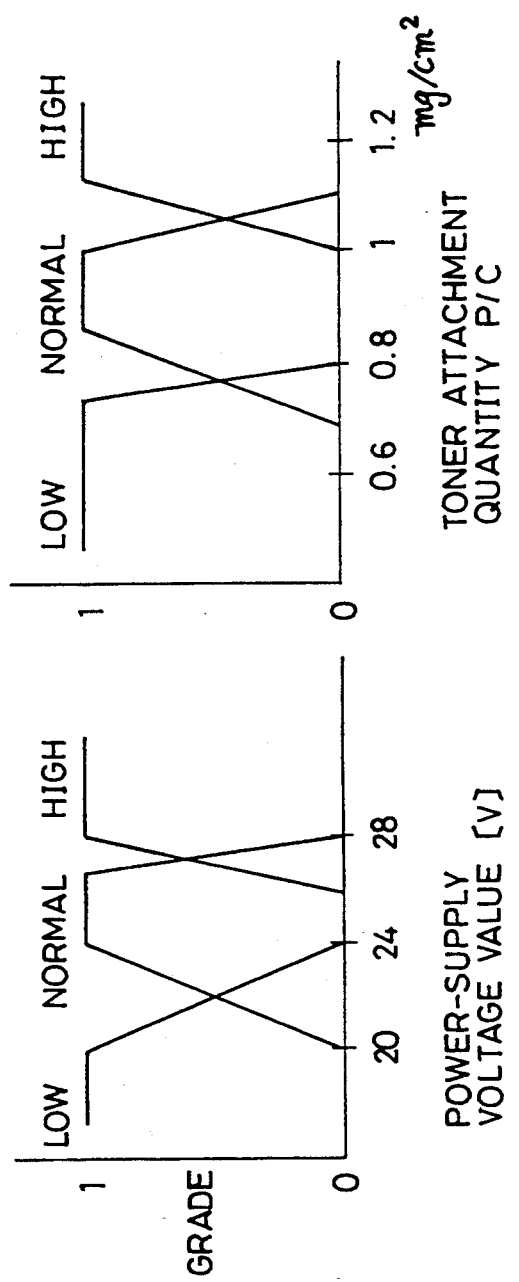
FIG. 26 is a diagram for describing a membership function used in one embodiment of the present invention.

For example, a grade of condition 1 "power supply is normal" of rule No. 1 of FIG. 25 is obtained by evaluating a value of power supply voltage of a copying machine transmitted from a data terminal side referring to the membership function "power supply is normal" of FIG. 26.

As for the condition 1 "image is faint" of rule No. 5 of FIG. 25, when "image is faint" is selected from the selection image (refer to FIG. 23) by key input operation by an operator (refer to S93 in FIG. 16), it is "grade = 1", and when it is not selected, "grade = 0". The data such as membership functions corresponding to respective conditions and contents and rule weights of respective rules assigned to each machine model of copying machine are stored in the RAM 97.

When the diagnostic process is started, first, a model of a machine which has transmitted data is determined, and a data base corresponding to that machine model is called from the RAM 97 (S950). All of possibilities C (k) are cleared to "0" (S951). k is a number corresponding to a type of conclusion (conclusion number), which is given as $$k = n\,(i)$$

That is to say, it is given as a value determined by a rule number i.

Next, after an initial value 1 is substituted into a rule number i (S953), possibilities of respective rules are operated in an ascending order of rule numbers i (S961–S971, S975), and possibilities C (k) = C (n (i)) of respective conclusions are updated in an ascending order of rule numbers (=the order of k is random) on the basis of the operated possibilities of rules i (S973).

When operating a possibility of rule i, first, grades of conditions of the rule i are operated in an ascending order of condition numbers j (S961–S967).

When grades are operated for all the conditions of the rule i (YES in S967), next, the minimum value (minG (i, 1), G (i, 2), . . . G (i, j−1)) of the operated grades is multiplied by a rule weight R (i) of the rule i (S971).

The possibility D of the rule i is thus calculated.

Next, a possibility C (k) = C (n (i)) of conclusion number k is operated. That is, the possibility D of rule i operated in step S971 is substituted into $$C\,(n\,(i)) \leftarrow C\,(n\,(i)) + D - C\,(n\,(i)) \times D$$

(S973), and possibilities C (k) = C (n (i)) are sequentially updated in an ascending order of rule numbers.

A possibility C (k) of each conclusion is thus calculated. If that diagnostic process is responding to setting change transmission from a data terminal, that is, if it is the first diagnostic process after changing set condition (for example, toner concentration and the like) of that copying machine on the basis of a setting change instruction (described later) from the center (YES in S978), a possibility comparing process (S979) is effected. Details of the possibility comparing process will be described later.

* Magnitude of possibility and level of changing set condition

As described above, when a possibility of a measure of changing set conditions (for example, control toner concentration and the like) of copying machine is large (for example, equal to or more than 0.8), a control signal for instructing change of toner concentration (setting change instruction) is transmitted to the data terminal and a DTID of that data terminal and the possibility of instructed setting change are stored in the RAM 97 (S925).

The degree of changing set conditions can be adjusted corresponding to magnitude of a possibility as described below.

For example, in FIG. 25, if "an amount of attached toner =0.75 mg" in data transmitted from a data terminal, referring to the membership function of FIG. 26, the grade of condition 1 "P/C attached toner amount is small" of rule No. 7 is "0.5".

Accordingly, by multiplying the above grade by the rule weight "0.7" of the rule No. 7 according to the rule No. 7, a possibility of the measure "increase control toner concentration" at this point is found out to "0.5 ×0.7=0.35".

Next, when a communication is received from a user informing "image is faint" and an operator selects "image is faint" in the selection screen of FIG. 23 correspondingly, by the rule No. 6 of FIG. 25, a possibility "0.7" is added to the measure "increase control toner concentration". Accordingly, it is necessary to synthesize the above-mentioned two possibilities, and the following composite possibility, is obtained accordingly.

"0.35+0.7−0.35×0.7=0.805"

The composite possibility is rather large. Accordingly, a setting change instruction is transmitted to the data terminal from the CPU 91 on the center side to "increase control toner concentration of copying machine by one level".

Correspondingly, the data terminal transmits a setting change command "1,4 (refer to FIG. 28)" to the CPU 41 of copying machine 4 in order to increase the current toner concentration "7%" by one step to "8%".

Thus, the toner concentration of copying machine is controlled to 8%.

On the other hand, if transmission data from the data terminal indicates "attached toner quantity =0.6 mg", the grade of condition 1 "P/C quantity of attached toner is small" of the rule No. 7 is "1.0" with reference to the membership function.

Accordingly, a possibility of the measure of "increase control toner concentration" at this point is "1.0×0.7=0.7" by such an operation as described above.

Next, similarly to the above description, if a communication "image is faint" is received from the user, it is synthesized with a possibility of measure "increase control toner concentration" and the following composite possibility is obtained.

"0.7+0.7−0.7×0.7=0.91"

Since the composite possibility has an extremely large value, a setting change instruction indicating to "increase control toner concentration of copying machine by two steps" from the center side is transmitted to the data terminal.

Correspondingly, the data terminal transmits a setting change command "1, 5 (refer to FIG. 28)" to the CPU 41 of copying machine 4 in order to increase the current toner concentration "7%" to "9%" by two steps.

Thus, the toner concentration of copying machine is controlled to be 9%.

In this way, a level of changing setting is adjusted corresponding to magnitude of possibility.

Figure 20:
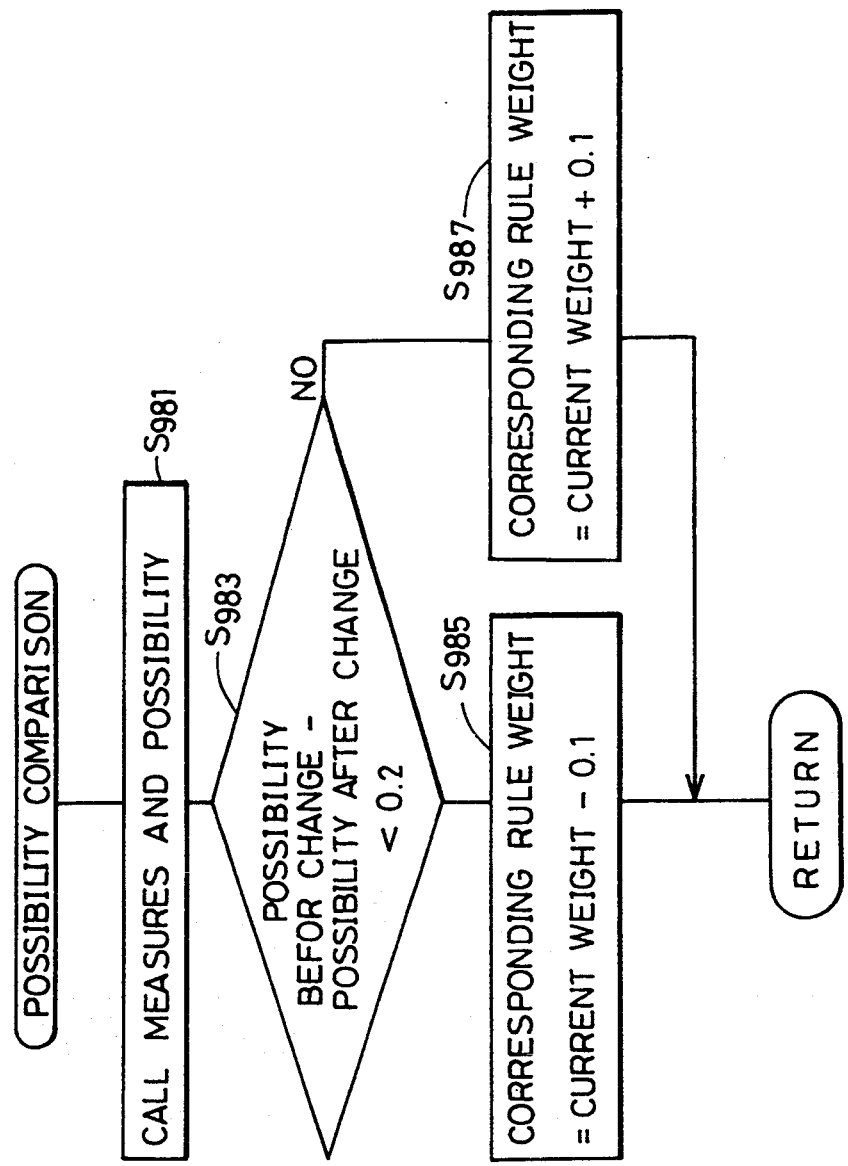
FIG. 20 is a flow chart illustrating comparison of possibility in the flow chart of FIG. 19.

A possibility comparing process is shown in FIG. 20 in detail. First, from data stored in S925, a possibility of a measure to be taken stored together with a DTID of the data terminal is read out (S981). Next, comparing the read possibility and the possibility after the setting change which is calculated in S973 (S983), if (a value before setting change—a value after the change) is smaller than 0.2, since it means that setting change has produced no effects, data in the RAM 97 is re-written so that the rule weight corresponding to the performed setting change is reduced (S985). On the other hand, if a difference of possibilities is equal to or larger than 0.2 before and after setting is changed, the rule weight corresponding to the performed change of setting is increased (S987).

As described above, in the present invention, in a copying machine control system in which copying machines each corresponding to a copying machine control device are collectively controlled on the basis of data transmitted from each copying machine control device to a centralized control unit through a communication line, operation is implemented by fuzzy reasoning referring to a knowledge base on the basis of data received from the communication line and/or operationally inputted data to output conditions of copying machines, measures to be taken, and possibilities to the centralized control unit.

According to the present invention, various kinds of data related to each copying machine are automatically collected in real time. Also, the fuzzy operation referring to knowledge base is implemented on the basis of the data and the like and conditions of copying machine, measures to be taken and possibilities are displayed.

Accordingly, even a not well-experienced service man can obtain the best and specific instructions about adjustment, repair and the like, and can take appropriate measures quickly.

Furthermore, it is not necessary to refer to a manual for each machine model when adjusting, repairing or the like.

Furthermore, the know-how accumulated in the process of research studies and development, or in experiences in the field work can be effectively utilized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control system for an image forming apparatus of the type including an image forming apparatus for forming an image on paper and a control unit connected to the image forming apparatus through a communication line, wherein
said image forming apparatus includes:
image forming means for implementing an image forming operation according to a pre-set value for determining picture quality,
a plurality of detecting means for detecting respectively different physical quantities with respect to an operational condition of said image forming means, and means for transmitting to said control unit through said communication line a result detected by said detecting means, and wherein
said control unit includes:
  means for receiving said detected result transmitted from said image forming apparatus,
  storing means storing a plurality of membership functions representing possibilities of occurrence of certain abnormalities corresponding to said respective physical quantities,
  diagnosing means for determining the possibilities of occurrence of plural kinds of abnormalities corresponding to said detected result received by said receiving means on the basis of the plurality of membership functions stored in said storing means, and
  a display means for displaying the content of a diagnosis determined by said diagnosing means.

2. The control system according to claim 1, wherein said display means displays an abnormality whose possibility of occurrence, as determined by said diagnosing means, is higher than a predetermined value.

3. The control system according to claim 1, wherein said display means displays a method of repair corresponding to an abnormality whose possibility of occurrence, as determined by said diagnosing means, is higher than a predetermined value.

4. The control system according to claim 1, wherein said display means displays information indicating at least one of an identification of said plural kinds of abnormalities and methods of repair corresponding to respective abnormalities in a descending order of possibility of occurrence, as determined by said diagnosing means.

5. The control system according to claim 1, wherein said display means displays information indicating at least one of an identification of the abnormality whose possibility of occurrence, as determined by said diagnosing means, is the highest and a method of repair corresponding to the abnormality.

6. The control system according to claim 1, wherein said detecting means includes means for detecting the density of an image formed by said image forming means.

7. The control system according to claim 1, wherein said detecting means includes measuring means for measuring the surface potential of a photoreceptor.

8. A control system according to claim 1, wherein said detecting means includes means for detecting toner concentration in a developing agent.

9. A control system for an image forming system of the type including a plurality of image forming apparatuses for forming images on paper and a control unit connected to said plurality of image forming apparatuses through a communication line, wherein
each said image forming apparatus includes:
  image forming means for implementing an image forming operation according to a pre-set value for determining picture quality,
  a plurality of detecting means for detecting respectively different physical quantities with respect to operational conditions of said image forming means, and
  means for transmitting a result detected by said detecting means to said control unit through said communication line, and wherein
said control unit includes:
  means for receiving said detected result transmitted from each image forming apparatus,
  storing means for storing a plurality of membership functions representing possibilities of occurrence of certain abnormalities corresponding to said respective physical quantities,
  diagnosing means for determining possibilities of occurrence of plural kinds of abnormalities corresponding to said detected result received by said receiving means for each image forming apparatus on the basis of the plurality of membership functions stored in said storing means, and
  a display means for displaying the content of a diagnosis determined by said diagnosing means.

10. The control system according to claim 9, wherein said control unit determines an abnormality whose possibility of occurrence, as determined by said diagnosing means, is highest for each image forming apparatus and said display means displays a method of repair corresponding to the abnormality.

11. The control system according to claim 9, wherein said display means displays, for the abnormalities relating to all of said image forming apparatus determined by said diagnosing means, an identification of abnormalities whose possibilities of occurrence are higher than a predetermined value, in a descending order of possibilities as determined by said diagnosing means.

12. The control system according to claim 9, wherein said control unit further includes means for selecting an arbitrary image forming apparatus, and said display means displays an abnormality having a possibility of occurrence, as determined by said diagnosing means, which is higher than a predetermined value, with respect to said image forming apparatus selected by said selecting means, or a method of repair corresponding to the abnormality.

13. The control system according to claim 9, wherein said control unit further includes means for selecting an arbitrary image forming apparatus, and said display means displays said abnormalities related to said image forming apparatus selected by said selecting means or methods of repair corresponding to the abnormalities in a descending order of possibilities of occurrence as determined by said diagnosing means.

14. The control system according to claim 9, wherein said detecting means includes means for detecting the density of an image formed by said image forming means.

15. The control system according to claim 9, wherein said detecting means includes measuring means for measuring the surface potential of a photoreceptor.

16. The control system according to claim 9, wherein said detecting means includes means for detecting toner concentration in a developing agent.

17. A control system for an image forming system of the type including an image forming apparatus for forming an image on paper and a control unit connected to the image forming apparatus through a communication line, wherein
said image forming apparatus includes:
  image forming means for implementing an image forming operation according to a pre-set value for determining picture quality,
  detecting means for detecting a physical quantity related to an operating condition of said image forming means, first transmitting means for transmitting a result detected by said detecting means to said control unit through said communication line, first receiving means for receiving a control signal transmitted from said control unit, and control means for controlling said image forming means so that said preset value is changed on the basis of said control signal received by said first receiving means, and wherein said control unit includes:

second receiving means for receiving said detected result transmitted from said image forming apparatus, diagnosing means which employs a membership function indicating a possibility of occurrence of a certain abnormality in correspondence with said physical quantity, for determining said possibility corresponding to said detected result received by said second receiving means, wherein said possibility determined by said diagnosing means is a second value obtained by multiplying a first value obtained according to said membership function by a predetermined coefficient, and second transmitting means for transmitting said control signal to said first receiving means through said communication line on the basis of said possibility determined by said diagnosing means, wherein said detecting means detects said physical quantity a second time after said pre-set value is changed by said control means, said first transmitting means transmits to said control unit the value detected by said detecting means after said pre-set value has been changed, and said diagnosing means determines said possibility on the basis of said detected value transmitted from said first transmitting means after said pre-set value has been changed, and, when said possibility determined after said pre-set value has been changed is smaller by a predetermined value or more than the possibility determined before said pre-set value was changed, increases said coefficient and, when it is not, decreases said coefficient.

18. A control system for an image forming system of the type including an image forming apparatus for forming an image on paper and a control unit connected to the image forming apparatus through a communication line, wherein said image forming apparatus includes:

image forming means for implementing an image forming operation according to a pre-set value for determining picture quality, detecting means for detecting a physical quantity related to an operating condition of said image forming means, first transmitting means for transmitting a result detected by said detecting means to said control unit through said communication line, first receiving means for receiving a control signal transmitted from said control unit, and control means for controlling said image forming means so that said preset value is changed on the basis of said control signal received by said first receiving means, and wherein said control unit includes:

second receiving means for receiving said detected result transmitted from said image forming apparatus, diagnosing means which employs a membership function indicating a possibility of occurrence of a certain abnormality in correspondence with said physical quantity, for determining said possibility corresponding to said detected result received by said second receiving means, wherein said possibility determined by said diagnosing means is a second value obtained by multiplying a first value obtained according to said membership function by a predetermined coefficient, and second transmitting means for transmitting said control signal to said first receiving means through said communication line on the basis of said possibility determined by said diagnosing means, wherein said control unit comprises storing means for storing a possibility determined by said diagnosing means, said detecting means detects said physical quantity a second time after said pre-set value has been changed by said control means, said first transmitting means transmits to said control unit the value detected by said detecting means after said pre-set value has been changed, and said diagnosing means determines said possibility based on said detected value transmitted from said first transmitting means after said pre-set value has been changed, and compares the determined possibility after said pre-set value has been changed with the possibility determined before said pre-set value was changed, which is stored in said storing means, and changes said coefficient on the basis of a result of the comparison.

* * * * *